United States Patent
Chino et al.

(10) Patent No.: US 9,891,580 B2
(45) Date of Patent: Feb. 13, 2018

(54) DRIVE TRANSMISSION DEVICE AND IMAGE FORMING APPARATUS INCLUDING THE SAME

(71) Applicant: CANON KABUSHIKI KAISHA, Tokyo (JP)

(72) Inventors: Hideto Chino, Ashigarakami-gun (JP); Junichi Ochi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/989,650

(22) Filed: Jan. 6, 2016

(65) Prior Publication Data
US 2016/0209783 A1 Jul. 21, 2016

(30) Foreign Application Priority Data
Jan. 9, 2015 (WO) .................. PCT/JP2015/050439

(51) Int. Cl.
G03G 21/16 (2006.01)
F16H 1/20 (2006.01)

(52) U.S. Cl.
CPC .......... G03G 21/1647 (2013.01); F16H 1/20 (2013.01); G03G 2215/0177 (2013.01)

(58) Field of Classification Search
CPC .......... G03G 15/0808; G03G 15/1615; G03G 21/0177; G03G 21/1647; F16H 1/20
See application file for complete search history.

(56) References Cited

U.S. PATENT DOCUMENTS 8,509,673 B2 * 8/2013 Seto ........................ B65H 1/266
271/9.08
9,182,725 B2 * 11/2015 Hayakawa ........... G03G 15/757
2002/0018668 A1 * 2/2002 Kanno ............... G03G 15/0882
399/106
2003/0076396 A1 * 4/2003 Imai ........................ B41J 11/70
347/101
2013/0223906 A1 * 8/2013 Tomatsu .............. G03G 15/757
399/361
2016/0062272 A1 * 3/2016 Fujiwara ............ G03G 15/0887
399/27

FOREIGN PATENT DOCUMENTS

| JP | 3-033255 U | | 4/1991 |
| JP | 6-50406 A | | 2/1994 |
| JP | 10-148984 A | | 6/1998 |
| JP | 10148984 A | * | 6/1998 |
| JP | 2008-002569 A | | 1/2008 |
| JP | 2014-105113 A | | 6/2014 |
| JP | 2014-164256 A | | 9/2014 |
| JP | 2014164256 A | * | 9/2014 |

* cited by examiner

*Primary Examiner* — David M Gray
*Assistant Examiner* — Laura Roth
(74) *Attorney, Agent, or Firm* — Canon U.S.A., Inc. IP Division

(57) ABSTRACT

An elastic force of an elastic member 11 required for rotating a driven rotational body 8b is decreased. A first rotational body 8d and a second rotational body 9a arranged downstream of a driven rotational body 8b in a drive train that transmits a driving force from a driving rotational body 7 to a driven member 4 are included. The first rotational body 8d rotates in synchronization with the driven rotational body 8b. The second rotational body 9a is rotated by the first rotational body 8d and rotates the driven member 4. The first rotational body 8d rotates without rotating the second rotational body 9a when the driven rotational body 8b rotates by an elastic force of an elastic member 11.

15 Claims, 30 Drawing Sheets

DRIVE TRANSMISSION DEVICE AND IMAGE FORMING APPARATUS INCLUDING THE SAME

TECHNICAL FIELD

The present invention relates to a drive transmission device that intermittently transmits drive and an image forming apparatus, such as a copier or a printer, including the drive transmission device.

BACKGROUND ART

In related art, an image forming apparatus includes a configuration that intermittently transmits a driving force from a drive source. PTL 1 discloses a drive transmission device for intermittently driving a sheet feed roller as a driven member.

The drive transmission device in PTL 1 includes a driving gear constantly rotated by a motor, and a driven gear that meshes with the driving gear and rotates, and hence that transmits a driving force to the sheet feed roller. The driven gear has a toothless portion. Then, by retaining the driven gear with a claw, the driven gear is stopped at a position, at which the toothless portion faces the driving gear, and the drive transmission from the driving gear to the driven gear is cut off. By releasing the retention on the driven gear with the claw, the driven gear meshes with the driving gear again and is rotated. With this configuration, the sheet feed roller is intermittently driven.

Also, in PTL 1, when the driven gear is rotated to the position, at which the toothless portion faces the driving gear for stopping the driven gear, or when the stopped driven gear is rotated to the position, at which the driven gear meshes with the driving gear again, the toothless portion of the driven gear faces the driving gear. Owing to this, it is difficult to obtain a rotational force from the driving gear and rotate the driven gear. Therefore, in PTL 1, the driven gear is rotated by an elastic force of a tension spring or a leaf spring.

CITATION LIST

Patent Literature

PTL 1 Japanese Patent Laid-Open No. 6-50406

However, the configuration in PTL 1 is a drive transmission configuration in which, if the driven gear (a driven rotational body) is rotated, all members from the driven gear to the sheet feed roller as the driven member constantly rotate. Hence, the tension spring or the leaf spring as an elastic member that rotates the driven gear is required to be a configuration that applies a relatively large elastic force that can rotate all the members from the driven gear to the driven member.

If the elastic force of pressing the driven rotational body is large as described above, problems may occur as follows. For example, to generate a large elastic force, an expensive elastic member or a large elastic member has to be used. This may increase the size and cost of the apparatus. Also, the driven rotational body, the claw that retains the driven rotational body, or the portion that supports the elastic member is required to be made of a material in a shape that can resist the large elastic force of the elastic member. The apparatus may be increased in size and cost due to the material and shape.

Also, sound which is generated because the elastic member collides with the driven rotational body when the elastic member presses the driven rotational body, and sound which is generated because the driven rotational body rotated by the elastic member collides with the claw may be increased by the amount of the large elastic force.

To address the above-described problems, an object of the present invention is to decrease the elastic force of the elastic member required for rotating the driven rotational body.

SUMMARY OF INVENTION

Accordingly, the present invention provides a drive transmission device including a driving rotational body, a driven rotational body that rotates by engaging with the driving rotational body, a driven member that is rotated by the rotation of the driven rotational body, and an elastic member that rotates the driven rotational body by an elastic force when the driven rotational body does not engage with the driving rotational body. The drive transmission device includes a first rotational body and a second rotational body arranged downstream of the driven rotational body in a drive train that transmits a driving force from the driving rotational body to the driven member, the first rotational body being configured to rotate in synchronization with the driven rotational body, the second rotational body being configured to be rotated by the first rotational body and rotate the driven member. The first rotational body rotates without rotating the second rotational body when the driven rotational body rotates by the elastic force of the elastic member.

Further features of the present invention will become apparent from the following description of exemplary embodiments with reference to the attached drawings.

DESCRIPTION OF EMBODIMENTS

Drive transmission devices according to embodiments of the present invention and image forming apparatuses including the drive transmission devices are described below.

First Embodiment

Image Forming Apparatus

First, a schematic configuration of an image forming apparatus 100 and a flow of an image forming operation are described with reference to FIG. 17.

Figure 17:
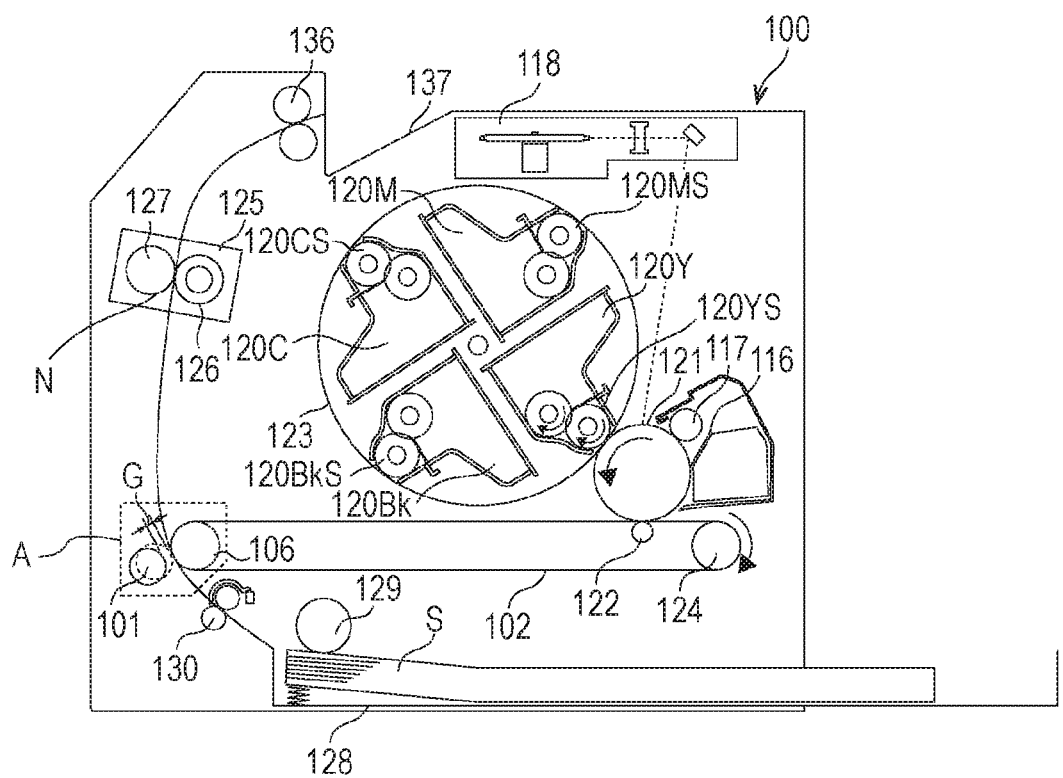
FIG. 17 is a schematic cross-sectional view of an image forming apparatus.

FIG. 17 is a schematic cross-sectional view showing a general configuration of the color image forming apparatus 100 including image forming units configured to respectively form images of four colors (yellow Y, magenta M, cyan C, black Bk). The image forming apparatus 100 includes, as major members for image formation, a photosensitive drum 121, a charging roller 117, a development rotary 123, a belt 102, and a fixing unit 125. The photosensitive drum 121, the charging roller 117, and the development rotary 123 serve as toner-image forming means for forming a toner image on the belt 102.

The development rotary 123 rotatably supports a yellow developing unit 120Y, a magenta developing unit 120M, a cyan developing unit 120C, and a black developing unit 120Bk. The yellow developing unit 120Y, the magenta developing unit 120M, the cyan developing unit 120C, and the black developing unit 120Bk are respectively provided with developing rollers 120YS, 120MS, 120CS, and 120BkS that respectively house toners of corresponding colors. The belt 102 is an endless belt and wound around a driving roller 106 and a driven roller 124. The belt 102 is an image bearing body serving as an intermediate transfer body that can bear a toner image on its surface. The driving roller 106 rotates by a driving force from a motor (not shown), rotationally drives the belt 102, and hence causes the surface of the belt 102 to move.

An image forming operation on a recording material S is described. The image forming apparatus 100 rotates a sheet feed roller 129, hence feeds a sheet of the recording material S in a cassette 128, and convey the recording material S to a registration roller 130. The recording material S is in a standby state until an image is formed on the belt 102 being the endless conveyance belt serving as the intermediate transfer body rotatable at the position of the registration roller 130.

Meanwhile, the surface of the photosensitive drum 121, which is the image bearing body that bears the toner image, is uniformly charged with electricity by the charging roller 117 while the photosensitive drum 121 rotates, the surface of the photosensitive drum 121 is exposed to light by a laser scanner 118 that emits light in accordance with an image signal, and hence an electrostatic latent image for an yellow image is formed. The yellow developing unit 120Y houses a toner of yellow, and includes the developing roller 120YS. By applying a development voltage to the developing roller 120YS facing the photosensitive drum 121 having the electrostatic latent image formed thereon, the electrostatic latent image formed on the photosensitive drum 121 is developed with the toner of yellow. A voltage with a polarity reverse to the toner image formed on the photosensitive drum 121 is applied to a first transfer roller 122, so that the toner image on the photosensitive drum 121 is first transferred on the belt 102.

When the toner image of yellow is first transferred on the belt 102, the development rotary 123 rotates, the magenta developing unit 20M which executes image formation next rotationally moves, and the magenta developing unit 20M stops at the development position for image formation on the photosensitive drum 121. Then, the photosensitive drum 121 is charged with electricity and exposed to light similarly to the case of yellow, a toner image is formed by executing development with the toner of magenta by the developing roller 120MS, and the toner image is first transferred on the belt 102. At the first transfer, the toner image of magenta is transferred at a position, at which the toner image of magenta is superposed on the toner image of yellow already born on the belt 102 (hereinafter, referred to as "overlap transfer").

Then, similarly to the above-described case, toner images of cyan and black are formed on the photosensitive drum 121 by using the cyan developing unit 120C and the black developing unit 120Bk, and are overlap transferred on the belt 102. Accordingly, a color toner image, in which the toner images of the four colors including yellow, magenta, cyan, and black are superposed by overlap transfer, is formed on the belt 102.

After the color image is formed on the belt 102, the recording material S in the standby state at the registration roller 130 is conveyed to a second transfer unit A. The second transfer unit A includes a second transfer roller 101 that can contact and be separated from the surface of the belt 102, and the driving roller 106 (hereinafter, referred to as "counter roller 106"). In a period in which the toner images of the respective colors are overlap transferred on the belt 102 while the belt 102 is rotated, the second transfer roller 101 is located at a position being separated from the belt 102 by a gap G (a position indicated by a solid line in FIG. 17) to prevent the toner images already formed on the belt 102 from being disordered when the toner images pass through the second transfer unit A. The second transfer roller 101 moves and contacts the belt 102 (a position indicated by a broken line in FIG. 17) after the toner images are transferred on the belt 102 and before the recording material S is conveyed to an area between the second transfer roller 101 and the belt 102. Then, by applying a voltage with a polarity reverse to the toner to the second transfer roller 101, the toner image on the belt 102 is transferred on the recording material S being a transferred member, which is pinched and conveyed between the second transfer roller 101 and the belt 102.

The recording material S with the toner image transferred from the surface of the belt 102 is then conveyed to the fixing unit 125, and passes through a fixing nip portion N between a pressing roller 127 and a fixing roller 126. At this time, the toner image is heated, pressed, and hence fixed to the recording material S. Then, the recording material S is output onto a sheet output tray 137 at an upper section of a main body through a sheet output roller 136 so that an image surface faces the lower side. The image forming operation is ended.

Second-Transfer-Roller Separate Mechanism

As described above, since the second transfer roller 101 moves at predetermined timings, and hence contacts and is separated from the belt 102, the image forming apparatus 100 includes a contact/separate mechanism of the second transfer roller 101. The contact/separate mechanism is described below.

Figure 1A:
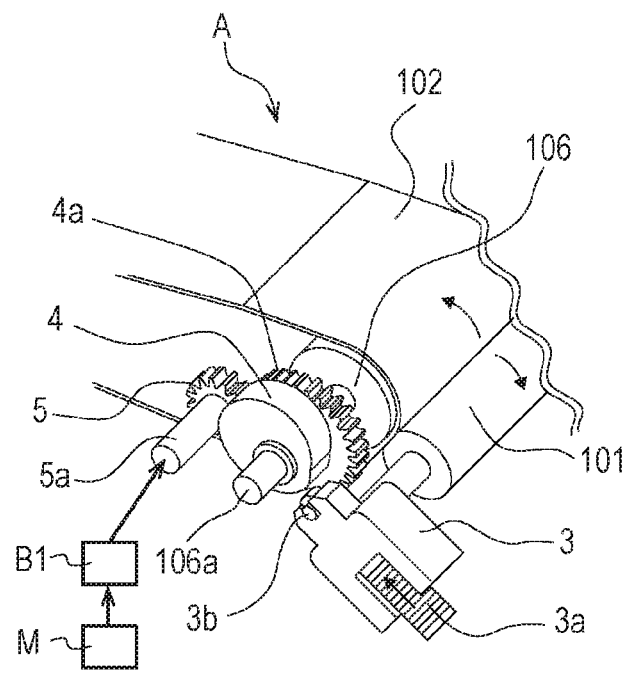
FIG. 1A is a perspective view of a second transfer unit.
Figure 1B:
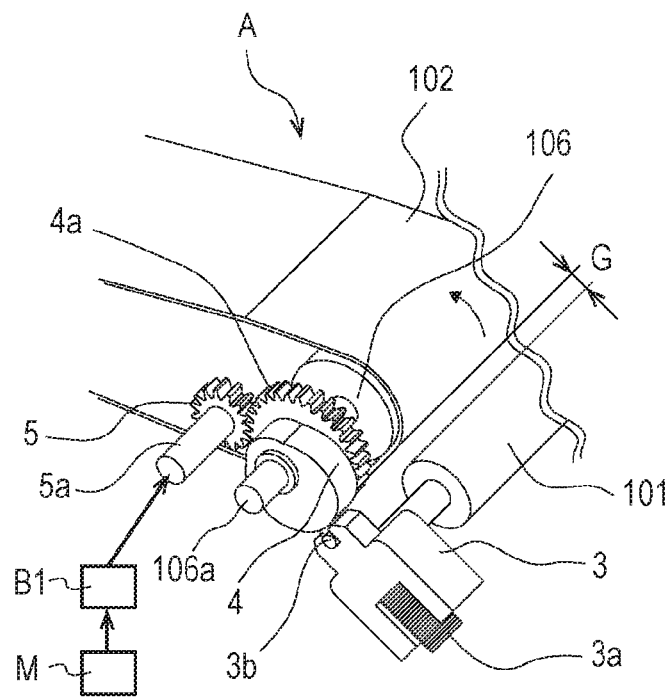
FIG. 1B is a perspective view of the second transfer unit.

FIGS. 1A and 1B are perspective views of the second transfer unit A. FIG. 1A shows a state in which the second transfer roller 101 contacts the belt 102. FIG. 1B shows a state in which the second transfer roller 101 is separated from the belt 102. The second transfer roller 101 is rotatably held by a holder 3. While FIGS. 1A and 1B illustrate a first end portion side in the longitudinal direction of the second transfer roller 101, a second end portion side is similarly configured.

A rotating shaft 106a supported by a frame (not shown) in the image forming apparatus 100 supports the counter roller 106 and a switch cam 4 rotatably around the rotation shaft 106a. The switch cam 4 has an integrally formed gear portion 4a. The gear portion 4a meshes with a switch gear 5 rotatably supported at a rotating shaft 5a. The ratio of the number of teeth of the gear portion 4a to the number of teeth of the switch gear 5 is 2:1. By rotating the switch gear 5 by a driving force from a motor M through a first clutch device B1, the gear portion 4a and the switch cam 4 are rotated together.

Also, the holder 3 includes a driven roller 3b. The holder 3 is urged (pressed) in a direction in which the second transfer roller 101 approaches the counter roller 106 by a spring 3a. The switch cam 4 rotates by ½ rotation (180 degrees) at a predetermined timing by the first clutch device B1, and then the switch cam 4 stops.

In the state shown in FIG. 1B, the driven roller 3b contacts the surface of the switch cam 4, hence the position of the second transfer roller 101 is restricted, and the second transfer roller 101 is separated from the belt 102 by the gap G. When the switch cam 4 rotates by ½ rotation from this state, as shown in FIG. 1A, the surface of the switch cam 4 is retracted from the driven roller 3b, and the second transfer roller 101 contacts the counter roller 106 by the urging force of the spring 3a. When the switch cam 4 is further rotated by ½ rotation from this state, the surface of the switch cam 4 contacts the driven roller 3b, the driven roller 3b is moved against the urging force (an elastic force) of the spring 3a, and the second transfer roller 101 is separated from the belt 102 by the gap G as shown in FIG. 1B. As described above, when the second transfer roller 101 is separated from the contact state with respect to the belt 102, a rotational load (a rotational torque) by the urging force of the spring 3a is applied to the switch cam 4.

First Clutch Device B1

Figure 2A:
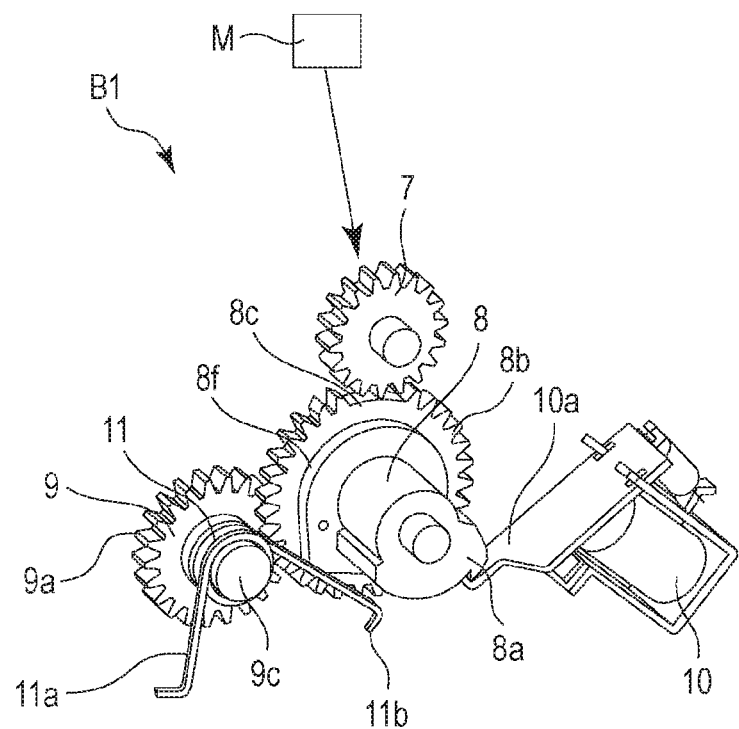
FIG. 2A is a perspective view of a first clutch device B1.
Figure 2B:
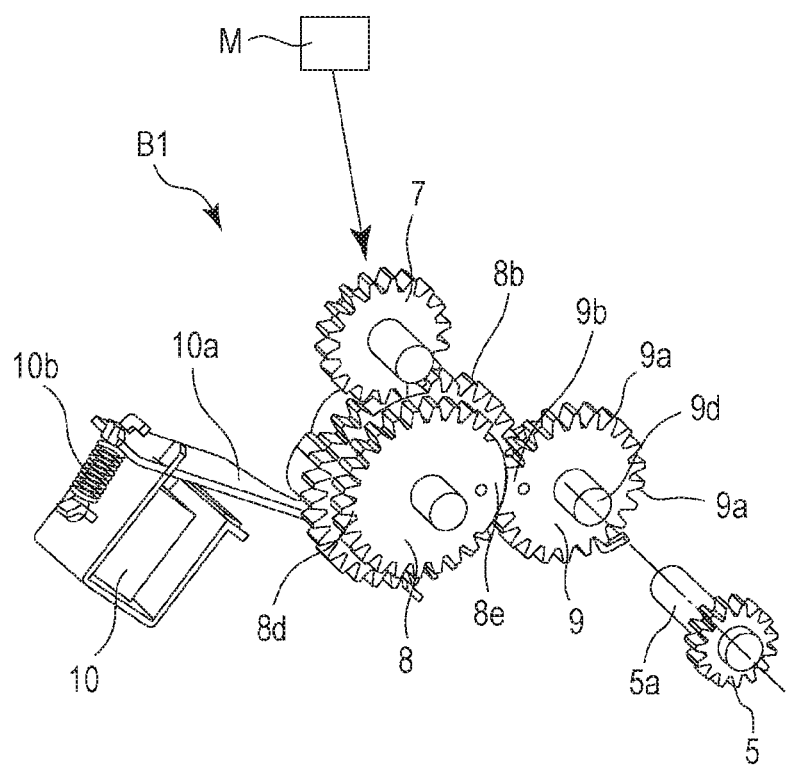
FIG. 2B is a perspective view of the first clutch device B1.

Described next is a configuration of the first clutch device B1 as a drive transmission device that is provided in a drive train for transmitting a driving force from the motor M to the switch cam 4 and that intermittently transmits the driving force, with reference to FIGS. 2A and 2B. FIGS. 2A and 2B are perspective views of the first clutch device B1. FIG. 2A is an illustration of the first clutch device B1 when viewed from the side opposite to the switch gear 5. FIG. 2B is an illustration of the first clutch device B1 when viewed from the side of the switch gear 5. Hereinafter, it is assumed that the side opposite to the switch gear 5 of the first clutch device B1 is "the front side of the first clutch device B1," and the side of the switch gear 5 is "the back side of the first clutch device B1."

The first clutch device B1 includes a gear 7 (a driving rotational body) that is constantly coupled with the motor M for drive, a gear 8 that can mesh with the gear 7, a gear 9 that can mesh with the gear 8, a solenoid 10 being means for restricting rotation of the gear 8, and a torsion spring 11 (an elastic member). The driving force from the motor M is transmitted to the switch gear 5 through the gears 7, 8, and 9 of the first clutch device B1, and rotates the switch cam 4 (a driven member).

The gear 8 includes, in an integrally former manner, a retained portion 8a that is retained by a retaining claw 10a of the solenoid 10, a tooth lacking gear 8b (a driven rotational body) that can mesh with the gear 7, a first slip gear 8d (a first rotational body) that meshes with the gear 9, and a cam portion 8f that contacts the torsion spring 11. When the gear 8 rotates, these retained portion 8a, tooth lacking gear 8b, gear 8d, and cam portion 8f rotate together. The tooth lacking gear 8b partly has a toothless portion 8c that does not mesh with the gear 7. The first slip gear 8d has a tooth-number diameter corresponding to 26 teeth; however, the first slip gear 8d partly has a slip portion 8e. The slip portion 8e has an arcuate surface in a protruding shape being coaxial with the rotation center of the first slip gear 8d and having the same radius as the radius of the pitch circle of the first slip gear 8d. Hence, the first slip gear 8d has 20 teeth in a portion other than the slip portion 8e.

The gear 9 includes, in an integrally formed manner, a second slip gear 9a (a second rotational body) that can mesh with the first slip gear 8d, a shaft 9c that holds the torsion spring 11, and a rotating shaft 9d integrally coupled with the rotating shaft 5a of the switch gear 5 shown in FIGS. 1A and 1B. When the gear 9 rotates, the second slip gear 9a, the shaft 9c, and the rotating shaft 9d are rotated together. The second slip gear 9a partly has a slip portion 9b that does not mesh with the first slip gear and extends along the slip portion 8e. The slip portion 9b has an arcuate surface in a recessed shape being coaxial with the rotation center of the first slip gear 8d when the slip portion 9b is located at a position, at which the slip portion 9b faces the slip portion 8e. The arcuate surface of this slip portion 9b has the same radius as the radius of the pitch circle of the first slip gear 8d, and extends along the arcuate surface of the slip portion 8e. The gear of the second slip gear 9a partly has a tooth-number diameter corresponding to 22 teeth; however, the second slip gear 9a partly has the slip portion 9b. Hence, the second slip gear 9a has 19 teeth in a portion other than the slip portion 9b. As described above, the number of teeth (19 teeth) of the second slip gear 9a is smaller than the number of teeth (20 teeth) of the first slip gear 8d by one tooth. To set the gear ratio of the first slip gear 8d to the second slip gear 9a at 1:1, the second slip gear 9a has the 19 teeth and an end portion (corresponding to one tooth) of the slip portion 9b, as a portion that is pressed and rotated by the 20 teeth of the first slip gear 8d. That is, a relationship of $Z1=Z2+1$ is satisfied for the gear ratio of 1:1, where $Z1$ is the number of teeth of the first slip gear 8d and $Z2$ is the number of teeth of the second slip gear 9a. Alternatively, the gear ratio of the first slip gear 8d to the second slip gear 9a is not necessarily the gear ratio of 1:1. The gear ratio can allow the first slip gear 8d to rotate by an integral number of rotations while the second slip gear 9a rotates by one rotation. The slip portion 9b is arranged at a position, at which the slip portion 9b faces the slip portion 8e, every rotation of the first slip gear 8d. For example, to set the gear ratio at 2:1 (the second slip gear 9a rotates by ½ rotation when the first slip gear 8d rotates by one rotation) without change in configuration of the first slip gear 8d, the slip portion 9b can be provided every 19 teeth. At this time, a relationship of $Z1=(Z2+1)/2$ is satisfied.

The gears 8 and 9 are assembled by aligning their relative rotation phases so that the slip portion 8e having the arcuate surface in the protruding shape extends along the slip portion 9b having the arcuate surface in the recessed shape. The slip portion 8e and the slip portion 9b are formed of a material with a small frictional coefficient to allow the slip portion 8e to easily slide on the slip portion 9b. Also, to improve the sliding property, a lubricant such as grease may be applied between the slip portion 8e and the slip portion 9b if required.

The solenoid 10 includes the retaining claw 10a and a return spring 10b. When the return spring 10b urges the retaining claw 10a toward the gear 8, the solenoid 10 is not energized, and the retained portion 8a is located at the position, at which the retained portion 8a faces the retaining claw 10a, the retaining claw 10a can restrict the rotation of the gear 8 by retaining the retained portion 8a. When the solenoid 10 is energized, the retaining claw 10a is retracted from the gear 8 against the urging force of the return spring 10b. If the retained portion 8a is retained by the retaining claw 10a, the retention on the retained portion 8a of the gear 8 by the retaining claw 10a can be released.

The torsion spring 11 includes a fixed arm 11a fixed at a fixing portion (not shown) and a movable arm 11b that contacts the cam portion 8f of the gear 8, and is held by the shaft 9c. When the gear 8 is in a predetermined rotation phase, by pressing the cam portion 8f by the elastic force of the torsion spring 11, the gear 8 is urged to rotate. Even when the toothless portion 8c of the tooth lacking gear 8b faces the gear 7 and hence the tooth lacking gear 8b cannot obtain a sufficient driving force by meshing with the gear 7, the gear 8 can be rotated by the pressing with the torsion spring 11.

Operation of First Clutch Device B1

Next, a drive transmission operation of the first clutch device B1 is described with reference to FIGS. 3A to 7B.

Figure 3A:
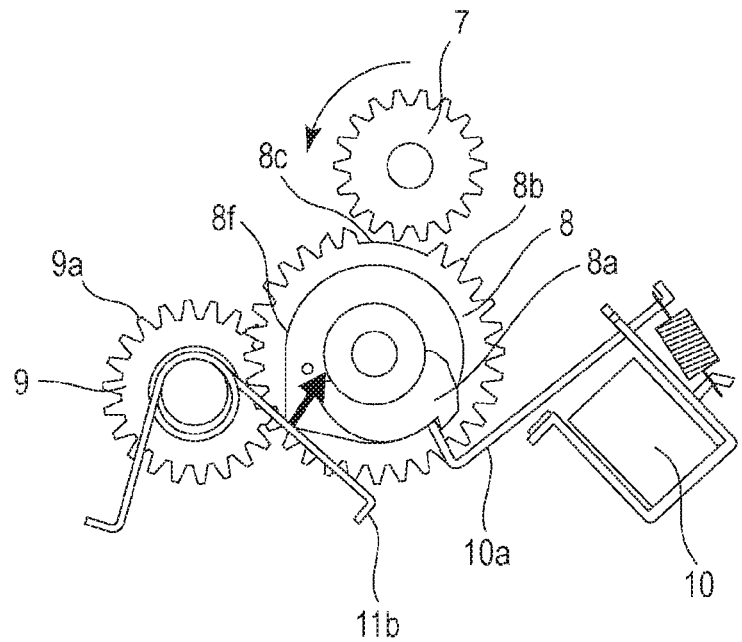
FIG. 3A is an illustration of the first clutch device B1 when viewed from the front side.
Figure 3B:
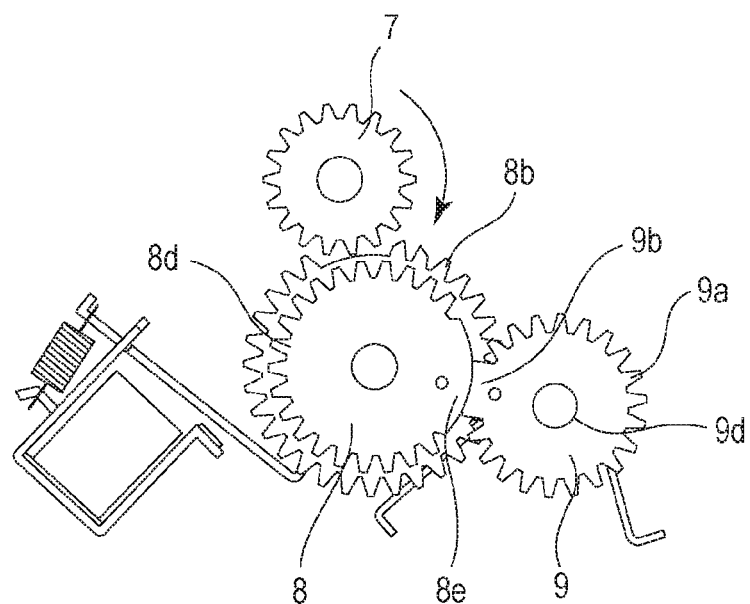
FIG. 3B is an illustration of the first clutch device B1 when viewed from the back side.
Figure 4A:
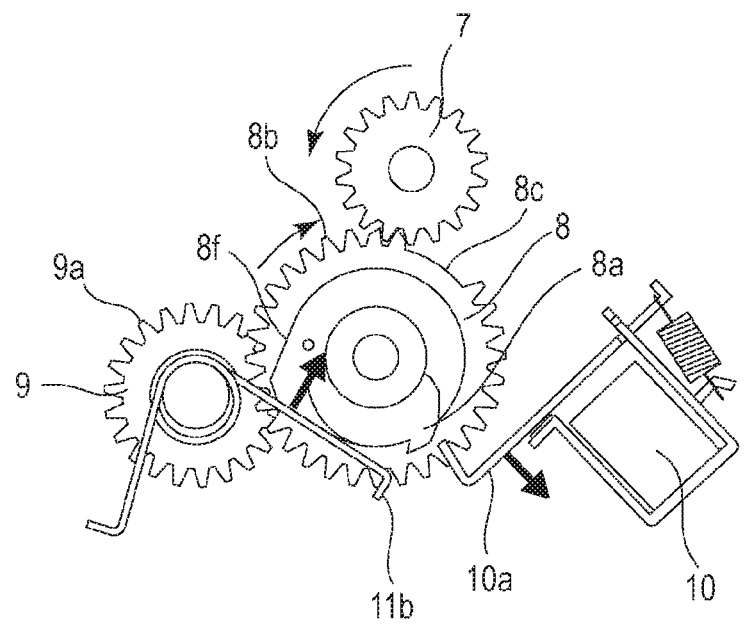
FIG. 4A is an illustration of the first clutch device B1 when viewed from the front side.
Figure 4B:
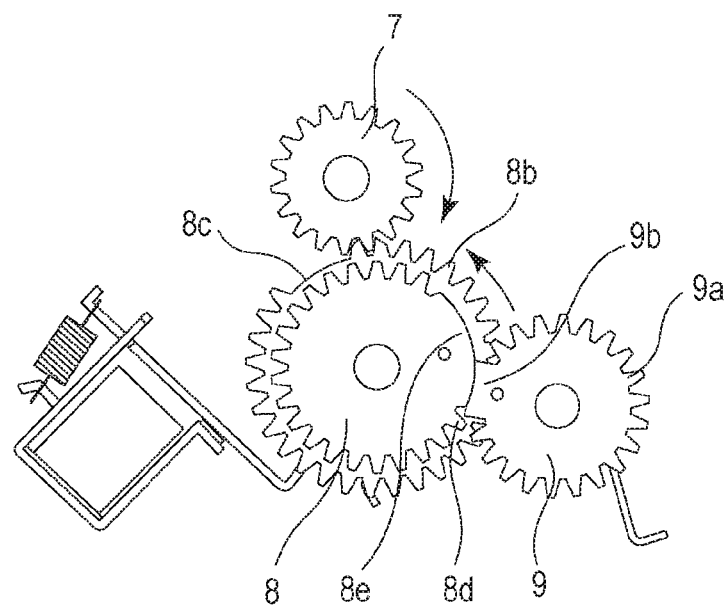
FIG. 4B is an illustration of the first clutch device B1 when viewed from the back side.
Figure 5A:
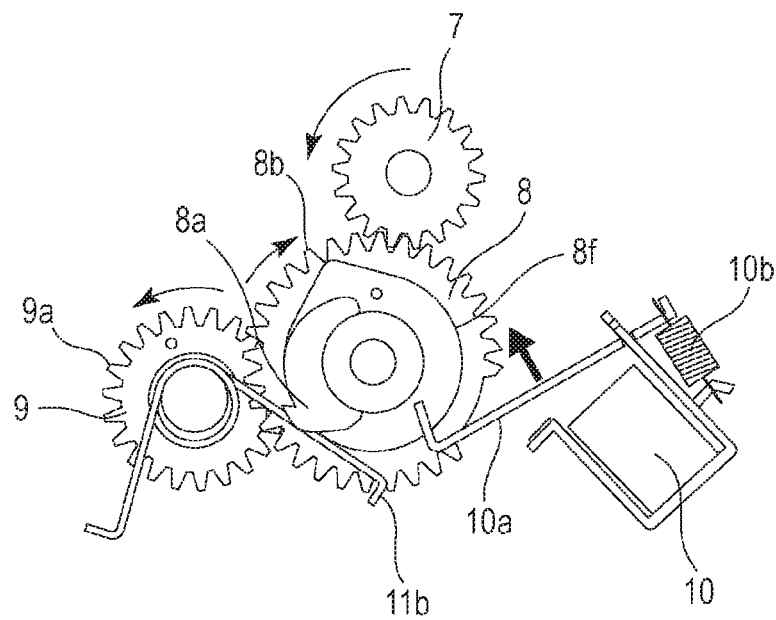
FIG. 5A is an illustration of the first clutch device B1 when viewed from the front side.
Figure 5B:
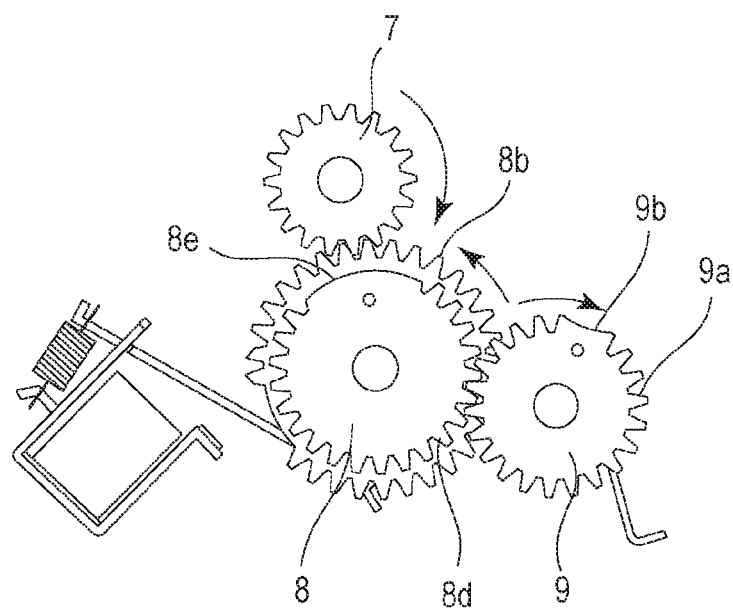
FIG. 5B is an illustration of the first clutch device B1 when viewed from the back side.
Figure 6A:
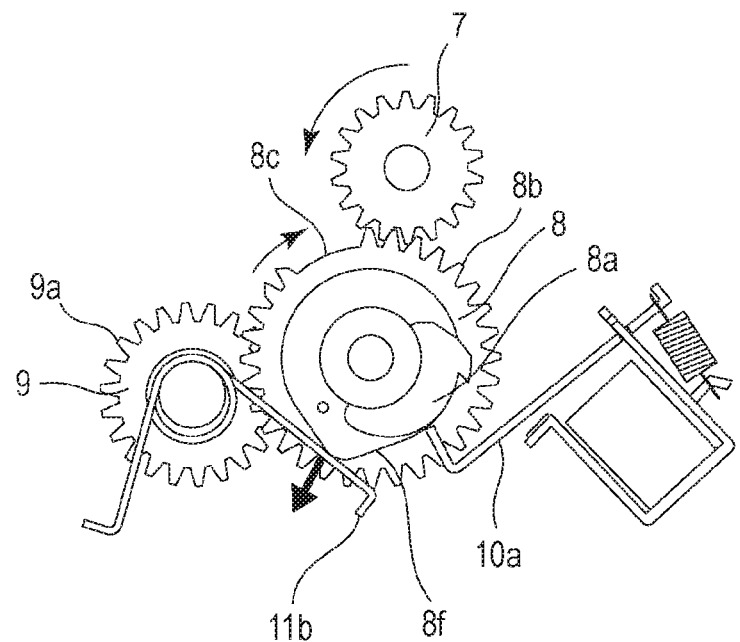
FIG. 6A is an illustration of the first clutch device B1 when viewed from the front side.
Figure 6B:
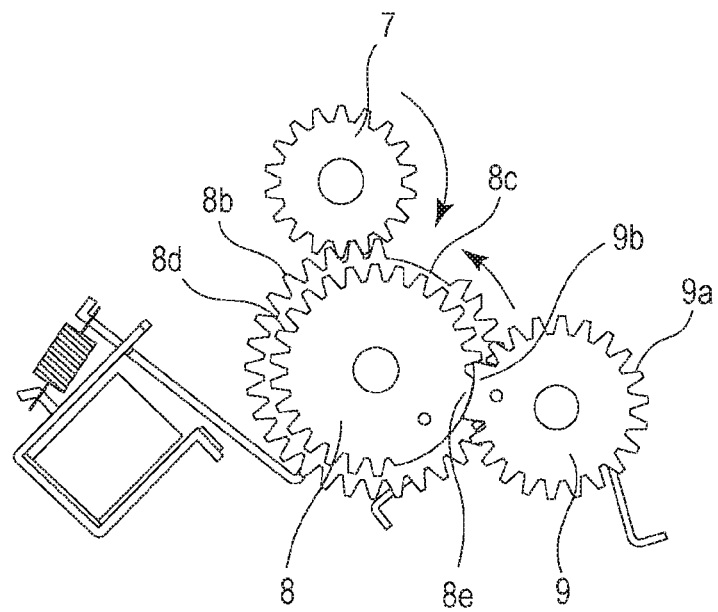
FIG. 6B is an illustration of the first clutch device B1 when viewed from the back side.
Figure 7A:
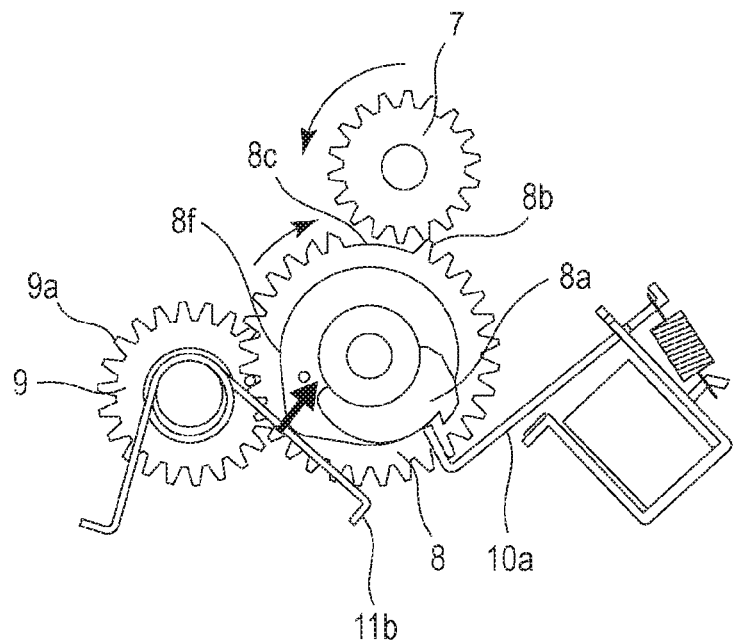
FIG. 7A is an illustration of the first clutch device B1 when viewed from the front side.
Figure 7B:
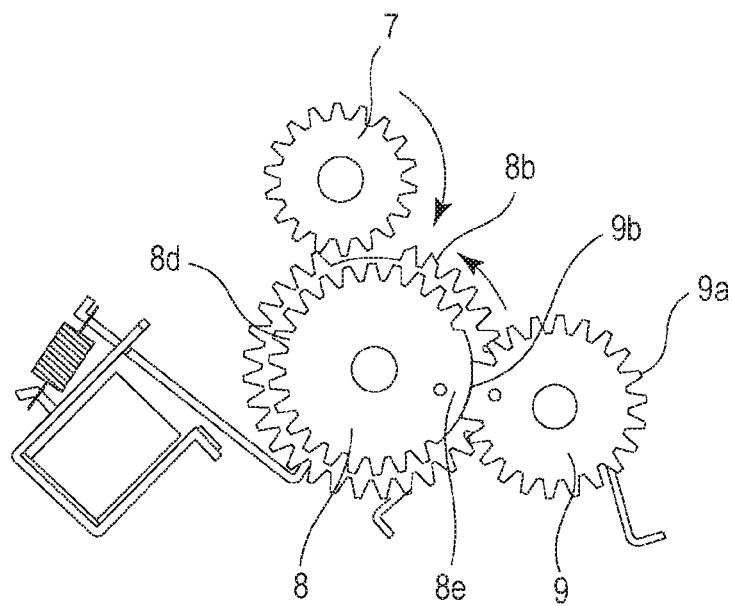
FIG. 7B is an illustration of the first clutch device B1 when viewed from the back side.

Each of FIGS. 3A, 4A, 5A, 6A, and 7A is an illustration of the first clutch device B1 when viewed from the front side, and each of FIGS. 3B, 4B, 5B, 6B, and 7B is an illustration of the first clutch device B1 when viewed from the back side. FIG. 3 shows the standby state of the first clutch device B1. FIGS. 4A and 4B show a state at start of drive transmission of the first clutch device B1. FIGS. 5A and 5B show a state during drive transmission of the first clutch device B1. FIGS. 6A and 6B show a state at end of drive transmission of the first clutch device B1. FIGS. 7A and 7B shows a state immediately before the gear 8 of the first clutch device B1 reaches a home position. Also, the rotation directions of the gears 7 and 8 in FIGS. 3A to 7B are as indicated by arcuate arrows illustrated next to the respective gears.

In the standby state of the first clutch device B1, as shown in FIG. 3A, the toothless portion 8c of the tooth lacking gear 8b faces the gear 7, and hence the tooth lacking gear 8b does not mesh with the gear 7. Also, the movable arm 11b of the torsion spring 11 presses the cam portion 8f so as to rotate the gear 8 clockwise; however, the retained portion 8a contacts the retaining claw 10a. Accordingly, the gear 8 is retained by the retaining claw 10a, and hence is at a stop without rotation. At this time, the gear 8 is at a home position.

Also, as shown in FIG. 3B, the slip portion 8e of the gear 8 faces the slip portion 9b of the gear 9. Accordingly, the rotation of the gear 9 (the second slip gear 9a) is restricted and stopped, and hence does not rotate. At this time, the gear 9 is at a home position. When the gear 9 is at the home position, since the rotation of the gear 9 is restricted, even if the switch cam 4 or the like is to be rotated by an external force or the like, the switch cam 4 is prevented from being rotated.

Next, start of drive transmission of the first clutch device B1 is described. As shown in FIG. 4A, when the solenoid 10 is energized and the retention on the retained portion 8a of the gear 8 with the retaining claw 10a is released, the movable arm 11b presses the cam portion 8f by the elastic force of the torsion spring 11, the gear 8 starts to rotate clockwise, and the tooth lacking gear 8b meshes with the gear 7. The cam portion 8f at this time functions as a pressed surface that is pressed by the movable arm 11b of the torsion spring 11. When the tooth lacking gear 8b meshes with the gear 7, the gear 8 receives the driving force transmitted from the gear 7, and the gear 8 rotates. The gear 8 starts to rotate from the home position only by the elastic force of the torsion spring 11 as described above because the gear 8 cannot mesh with the gear 7 rotating by the motor M while the gear 8 is stopped at the home position.

Also, when the gear 8 starts to rotate, the slip portion 8e of the first slip gear 8d of the gear 8 slides on the slip portion 9b of the second slip gear 9a, and hence the gear 8 starts to rotate without rotating the gear 9.

When the gear 8 rotates by a predetermined amount without rotating the gear 9a, as shown in FIG. 4B, a tooth of the first slip gear 8d next to an end portion at the upstream side of the slip portion 8e in the rotation direction of the gear 8 engages with an end portion of the slip portion 9b, and the gear 9 starts to rotate. Accordingly, the teeth of the first slip gear 8d mesh with the teeth of the second slip gear 9a, the second slip gear 9a meshes with the first slip gear 8d, and hence the gear 9 rotates. When the gear 9 starts to rotate, the switch gear 5 starts to rotate, the driving force is transmitted to the switch cam 4 through the switch gear 5, and hence the switch cam 4 starts to rotate.

While the gear 8 rotates only by the elastic force of the torsion spring 11, the slip portion 8e of the gear 8 rotates while sliding on the slip portion 9b of the gear 9, and the gear 9 does not rotate. The timing, at which the gear 9 starts to rotate, is after the timing, at which the tooth lacking gear 8b meshes with the gear 7, and during a period, in which the gear 8 already receives the driving force from the gear 7 and rotates. Accordingly, when the driving force is transmitted from the gear 9 to the switch cam 4 to rotate the switch cam 4, the tooth lacking gear 8b meshes with the gear 7 and the driving force from the motor M is transmitted to the gear 9.

Thereafter, as shown in FIG. 5A and FIG. 5B, while the gear 8 receives the driving force transmitted from the gear 7 and rotates, application of electricity to the solenoid 10 is stopped. Accordingly, the retaining claw 10a of the solenoid 10 is moved toward the gear 8 by the urging force of the return spring 10b, and the retaining claw 10a is arranged at the position, at which the retaining claw 10a can retain the retained portion 8a.

Then, as shown in FIG. 6B, when the meshing between the first slip gear 8d and the second slip gear 9a is ended by the rotation of the gear 8, the slip portion 8e faces the slip portion 9b. Accordingly, the gear 9 does not receive the driving force transmitted from the gear 8, the rotation of the gear 9 is stopped, and the gear 9 is arranged at the home position again. As described above, the gear 9 is rotated by one rotation by the gear 8, and the rotation of the gear 9 is stopped. Since the gear 9 is stopped in this way, the driving force is no longer transmitted to the gear 9 and the drive train arranged downstream of the gear 9, the switch gear 5 and the switch cam 4 are also stopped. At this time, as shown in FIG. 6A, the tooth lacking gear 8b still meshes with the gear 7, and the gear 8 rotates.

Then, by the rotation of the gear 8, the cam portion 8f presses and moves the movable arm 11b of the torsion spring 11 toward the fixed arm 11a against the elastic force. That is, the cam portion 8f is rotated, the torsion spring 11 is compressed, and the elastic force is increased (charged). The cam portion 8f at this time functions as a pressing surface that presses the movable arm 11b of the torsion spring 11 toward the fixed arm 11a.

Then, as the gear 8 rotates, as shown in FIG. 7A, the toothless portion 8c faces the gear 7, the tooth lacking gear 8b cannot mesh with the gear 7, and the gear 8 no longer receives the driving force from the gear 7. At this time, if the toothless portion 8c stops before moving to the position, at which the toothless portion 8c completely faces the gear 7, sound may be generated by slight collision between the rotating gear 7 and a tooth tip of the tooth lacking gear 8b. To avoid this, the gear 8 is further rotated without the driving force from the gear 7. To be specific, the cam portion 8f is pressed by the elastic force of the torsion spring 11 and the gear 8 is rotated to cause the toothless portion 8c to completely face the gear 7 and to cause the teeth of the tooth lacking gear 8*b* to be sufficiently retracted from the gear 7 in the rotation direction of the gear 8. The cam portion 8*f* at this time functions as a pressed surface that is pressed by the movable arm 11*b* of the torsion spring 11. The gear 8 rotates by the elastic force of the torsion spring 11 until the retained portion 8*a* is retained by the retaining claw 10*a* of the solenoid 10. When the retained portion 8*a* is retained by the retaining claw 10*a*, as shown in FIG. 3A, the gear 8 is stopped and is located at the home position.

As shown in FIG. 7B, while the gear 8 is rotated to the home position only by the elastic force of the torsion spring 11, the slip portion 8*e* of the gear 8 slides on the slip portion 9*b*. The gear 8 rotates to the home position without rotating the gear 9 and stops. This is because the slip portion 8*e* of the gear 8 faces the slip portion 9*b* of the gear 9 before the timing, at which the tooth lacking gear 8*b* no longer meshes with the gear 7, and the driving force of the gear 8 is no longer transmitted to the gear 9.

Then, when the solenoid 10 is energized again and the retaining claw 10*a* releases the retention on the retained portion 8*a* of the gear 8, the above-described intermittent drive transmission operation is executed.

As described above, when the gear 8 is at the home position, by energizing the solenoid 10 at a predetermined timing, the first clutch device B1 transmits the driving force to rotate the switch gear 5 by one rotation and to rotate the switch cam 4 by ½ rotation.

As described above, in this embodiment, with the first clutch device B1, while the gear 8 cannot obtain the driving force from the gear 7 and the gear 8 is rotated only by the elastic force of the torsion spring 11, the gear 8 is rotatable without rotating the gear 9. That is, in a period described below, the gear 8 is rotated only by the elastic force of the torsion spring 11. The period includes a period from when the retention between the retaining claw 10*a* and the retained portion 8*a* is released to when the tooth lacking gear 8*b* meshes with the gear 7, and a period from when the meshing between the tooth lacking gear 8*b* and the gear 7 is ended to when the retained portion 8*a* is retained by the retaining claw 10*a*. During this period, the slip portion 8*e* of the gear 8 faces the slip portion 9*b* of the gear 9. The gear 8 is rotatable without transmitting the driving force to the gear 9 and the drive train arranged downstream of the gear 9, and rotating the gear 9 and the downstream drive train. Hence, the elastic force of the torsion spring 11, which is means for rotating the gear 8 when the gear 8 cannot obtain the driving force from the gear 7, can be merely a force that is larger than a rotational resistance force of the gear 8.

With the configuration of related art in PTL 1, while the driven rotational body rotates by the elastic force of the elastic member, all members from the driven rotational body to the driven member constantly rotate. In contrast, in this embodiment, while the driven rotational body (the gear 8) rotates by the elastic force of the elastic member (the torsion spring 11), the first rotational body (the first slip gear 8*d*) rotates without rotating the second rotational body (the second slip gear 9*a*). Accordingly, with the configuration of this embodiment, the elastic force of the elastic member that rotates the driven rotational body can be smaller than the configuration of related art.

As the result, a small and inexpensive elastic member can be used. Accordingly, the increase in size and cost of the apparatus can be avoided by the amount of reduced size and cost of the elastic member. Also, the driven rotational body, the retaining claw that retains the driven rotational body, and the portion that supports the elastic member are not required to employ a material and a shape that resist a large elastic force. Accordingly, the increase in size and cost can be avoided with the shape and material.

Also, the sound which is generated because the elastic member collides with the driven rotational body when the elastic member presses the driven rotational body, and the sound which is generated because the driven rotational body rotated by the elastic member collides with the retaining claw can be decreased by the decreased amount of the elastic force.

Also, if the apparatus is assembled against the elastic force of the elastic member, the ease of assembly and workability are less degraded by the decreased amount of the elastic force.

Also, when the driven rotational body is rotated while the driving rotational body meshes with the driven rotational body, the pressing force of the elastic member serves as a rotational resistance of the driven rotational body. However, the rotational resistance by the pressing force of the elastic member is decreased by the decreased amount of the elastic force. Accordingly, the driving force required for the motor M serving as the drive source for rotating the driven rotational body can be decreased by the decreased amount of the rotational resistance. Accordingly, a low-output, inexpensive, and small drive source can be used.

Also, while the gear 9 is at the home position and the gear 8 rotates by the elastic force of the torsion spring 11, the driving force from the motor M is not transmitted from the first slip gear 8*d* to the second slip gear 9*a*. However, the slip portion 8*e* and the slip portion 9*b* have the shapes extending along each other, and the rotation of the second slip gear 9*a* is restricted. Accordingly, even if the drive train from the second slip gear 9*a* to the switch cam 4 is to be rotated by an external force or the like, the rotation of the drive train is restricted.

Other Configurations

The configuration described in this embodiment can be modified as follows.

As long as the rotation of the second slip gear 9*a* is restricted by a predetermined amount while the slip portion 8*e* of the gear 8 faces the slip portion 9*b* of the gear 9, a gap may be present between the arcuate surfaces of the slip portion 8*e* and the slip portion 9*b*.

Also, in view of the apparatus configuration, when the gear 9 is at the home position, if the rotation of the gear 9 is not required to be restricted, the first slip gear 8*d* can be rotatable without rotating the second slip gear 9*a* while the slip portion 8*e* faces the slip portion 9*b*.

Also, in this embodiment, the tooth lacking gear 8*b* and the first slip gear 8*d* are integrally molded and coaxially rotate. However, the tooth lacking gear 8*b* and the first slip gear 8*d* may rotate around different axes. That is, the first slip gear 8*d* can be located downstream of the tooth lacking gear 8*b* in the drive train from the motor M to the switch cam 4. Similarly, the switch gear 5 and the second slip gear 9*a* are not required to be coaxial, and the switch gear 5 can be located downstream of the second slip gear 9*a* in the drive train from the motor M to the switch cam 4.

Also, in this embodiment, the driving force is transmitted by the meshing of the gears; however, in a case of a configuration that transmits a driving force by rotation, a friction wheel or the like may be used.

Also, the first clutch device B1 of this embodiment is used for driving the contact/separate mechanism of the second transfer roller 101; however, the first clutch device B1 can be applied to another mechanism. For example, the first clutch device B1 can be applied to an intermittent rotation mechanism of the sheet feed roller 129, and a pressure release mechanism between the pressing roller 127 and the fixing roller 126. Also, in a case of an in-line image forming apparatus including a plurality of photosensitive drums, the first clutch device B1 can be applied to a contact/separate mechanism of a first transfer roller and a contact/separate mechanism of a developing roller. Further, the first clutch device B1 can be applied to a mechanism that turns ON and OFF transmission of a driving force from the drive source, and a mechanism that turns ON and OFF transmission of a driving force from the drive source to the photosensitive drum.

Second Embodiment

Second Clutch Device B2

Next, a second clutch device B2 as a drive transmission device according to a second embodiment of the present invention is described with reference to FIGS. 8A, 8B, 9, 10A, and 10B.

Figure 8A:
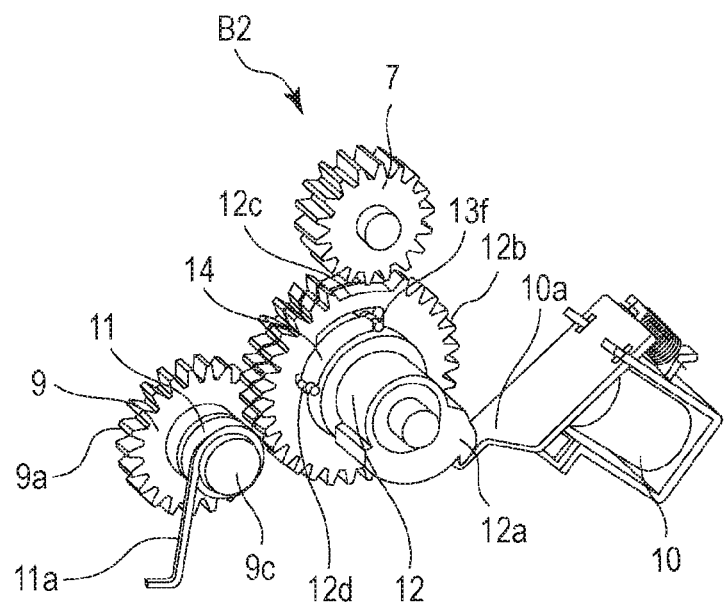
FIG. 8A is a perspective view of a second clutch device B2.
Figure 8B:
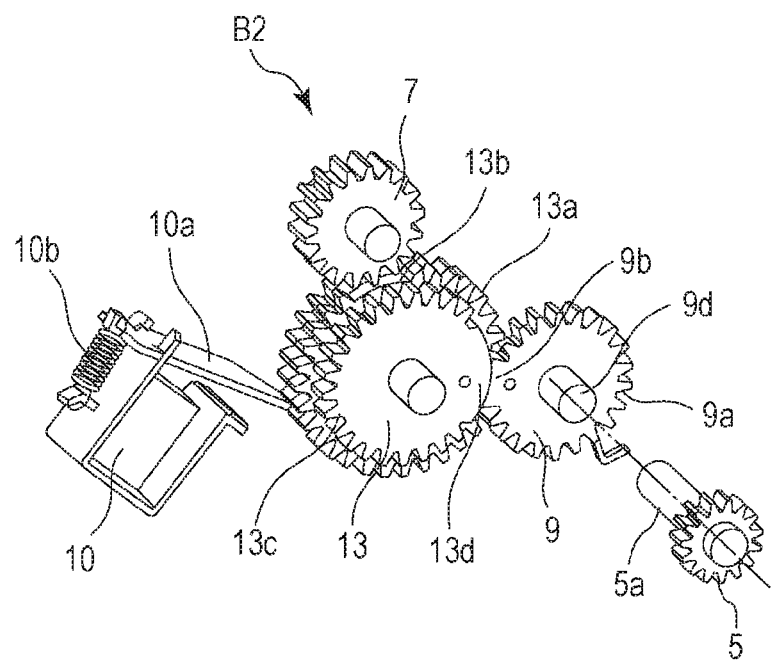
FIG. 8B is a perspective view of the second clutch device B2.
Figure 9:
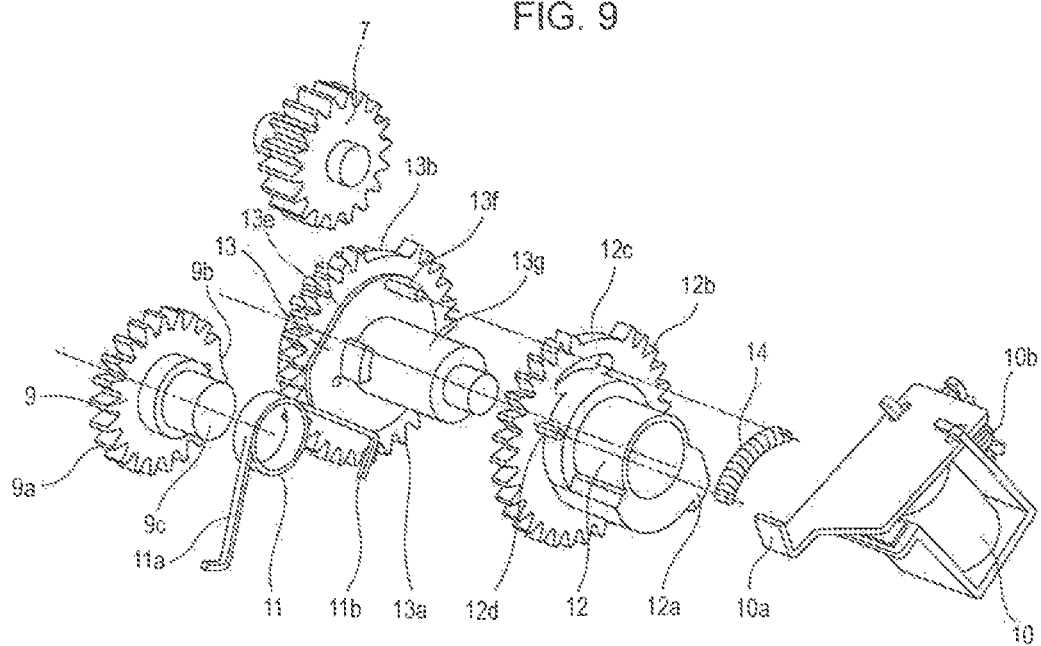
FIG. 9 is a perspective view of the second clutch device B2 before assembly.
Figure 10A:
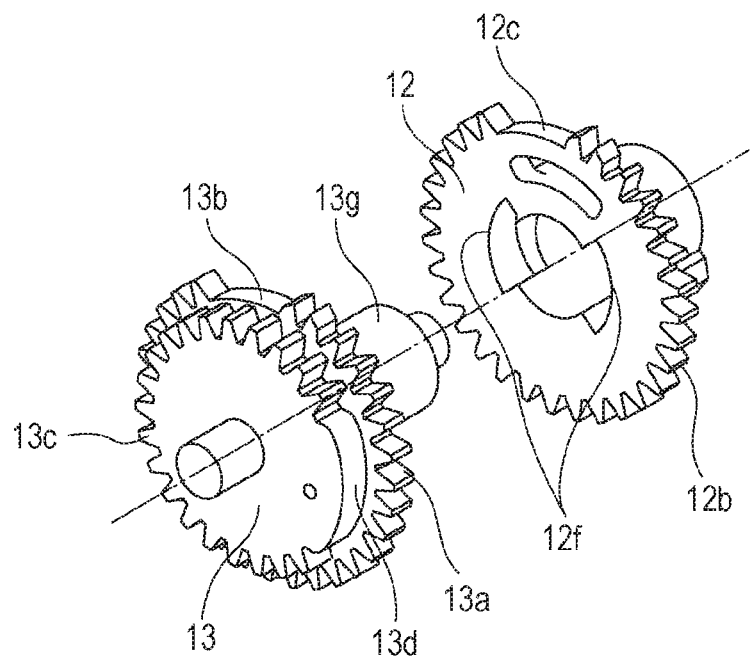
FIG. 10A is a perspective view explaining assembly of gears 12 and 13.
Figure 10B:
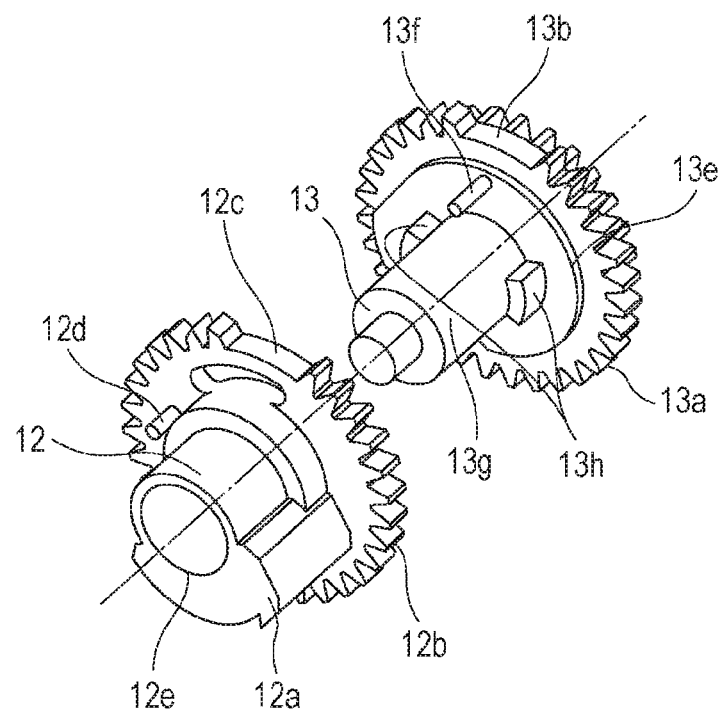
FIG. 10B is a perspective view explaining assembly of the gears 12 and 13.

FIGS. 8A and 8B are perspective views of the second clutch device B2 according to the second embodiment. FIG. 8B is a perspective view of the second clutch device B2 when viewed from the side facing the switch gear 5 in FIGS. 1A and 1B. FIG. 8A is a perspective view of the clutch device when viewed from the side opposite to FIG. 8B. FIG. 9 is a perspective view of the second clutch device B2 before assembly. FIGS. 10A and 10B are perspective views explaining assembly of a gear 12 and a gear 13. FIG. 10A is an illustration viewed from the gear 13 side, and FIG. 10B is an illustration viewed from the gear 12 side. Similar reference signs are applied to configurations similar to those in the above-described first embodiment, and the description is omitted.

The second clutch device B2 transmits the driving force from the motor M to the switch gear 5 similarly to the first clutch device B1 of the first embodiment. The second clutch device B2 differs from the first clutch device B1 in that the second clutch device B2 includes the gear 13 corresponding to the gear 8 of the first clutch device B1, and in addition, the gear 12 for rotating the gear 13 so that the gear 13 at a home position can mesh with the gear 7.

First, a configuration of the second clutch device B2 is described. The gears 7 and 9 are similar to those of the first clutch device B1, and hence the description is omitted.

The gear 12 includes, in an integrated manner, a trigger gear 12b that meshes with the gear 7, a retained portion 12a that is retained by the retaining claw 10a of the solenoid 10 and rotation is restricted, and a boss 12d arranged with a trigger spring 14. The trigger gear 12b partly has a toothless portion 12c that does not mesh with the gear 7.

The gear 13 includes, an integrated manner, a tooth lacking gear 13a that can mesh with the gear 7, a first slip gear 13c that meshes with the gear 9, a cam portion 13e that contacts the torsion spring 11 and applies an urging force to the gear 13 to rotate the gear 13, a boss 13f arranged with the trigger spring 14, and a rotating shaft portion 13g. The tooth lacking gear 13a partly has a toothless portion 13b that does not mesh with the gear 7. The first slip gear 13c partly has a slip portion 13d. The slip portion 13d has a pitch-circle diameter of a protruding shape being an arcuate surface with the same radius as the radius of the pitch circle of the first slip gear 8d. Also, the gear of the first slip gear 13c has a tooth-number diameter corresponding to 26 teeth; however, a tooth portion forming the first slip gear 13c is formed of 20 teeth.

The retaining claw 10a of the solenoid 10 can restrict rotation of the gear 12 by retaining the retained portion 12a of the gear 12.

A first end of the trigger spring 14 is fixed to the boss 12d of the gear 12, and a second end of the trigger spring 14 is fixed to the boss 13f of the gear 13. The trigger spring 14 urges the gear 12 and the gear 13 in a direction in which the gear 12 is attracted to the gear 13. Also, when the solenoid 10 is energized and the retaining claw 10a releases the retention on the retained portion 12a of the gear 12, the trigger spring 14 applies a rotation starting force to the gear 12, and the trigger gear 12b meshes with the gear 7.

The fixed arm 11a side of the torsion spring 11 is fixed, and the movable arm 11b side of the torsion spring 11 contacts the cam portion 13e of the gear 13 and urges the cam portion 13e toward the center of the rotating shaft portion 13g of the gear 13.

Next, arrangement of the gear 12 and the gear 13 is described. As shown in FIG. 10A and FIG. 10B, the gear 12 has a bearing portion 12e and a plurality of groove portions 12f. The bearing portion 12e is housed on the rotating shaft portion 13g of the gear 13. At this time, a plurality of key portions 13h of the gear 13 are housed in the groove portions 12f. In a state in which the key portions 13h are housed in the groove portions 12f, plays are provided between the key portions 13h and the groove portions 12f. The gear 12 can rotate relative to the gear 13 around the rotating shaft portion 13g by the amounts of the plays.

Operation of Second Clutch Device B2

Figure 11A:
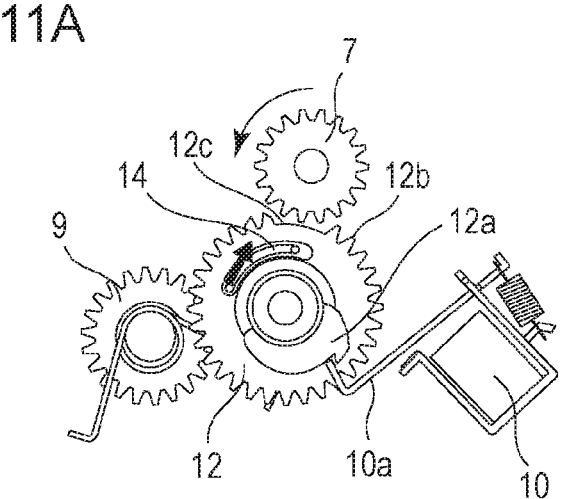
FIG. 11A is an illustration of the second clutch device B2 when viewed from the front side.
Figure 11B:
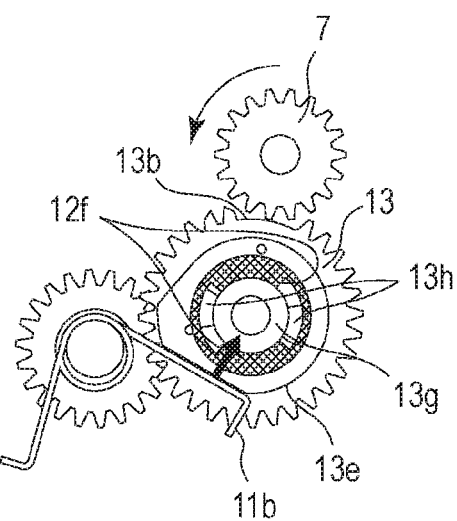
FIG. 11B is a cross-sectional view showing play amounts of groove portions 12f and key portions 13h.
Figure 11C:
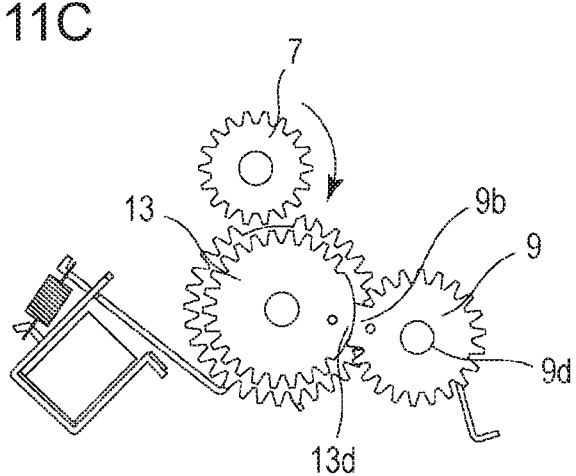
FIG. 11C is an illustration of the second clutch device B2 when viewed from the back side.
Figure 12A:
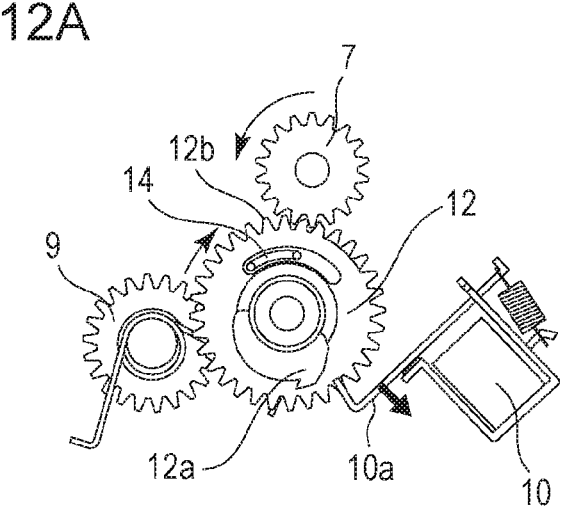
FIG. 12A is an illustration of the second clutch device B2 when viewed from the front side.
Figure 12B:
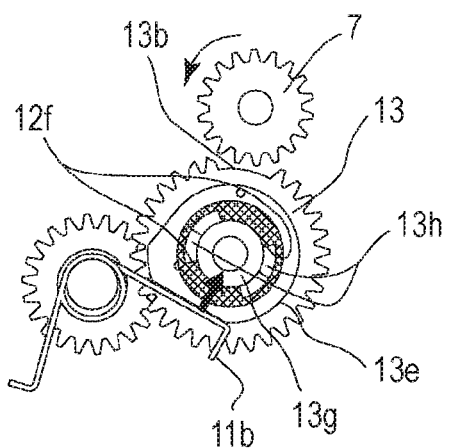
FIG. 12B is a cross-sectional view showing play amounts of the groove portions 12f and the key portions 13h.
Figure 12C:
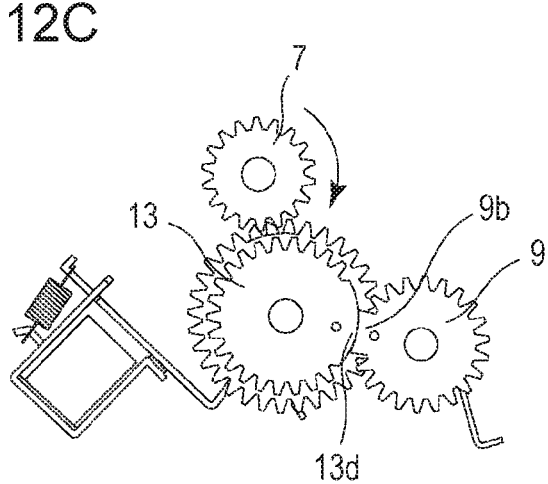
FIG. 12C is an illustration of the second clutch device B2 when viewed from the back side.
Figure 13A:
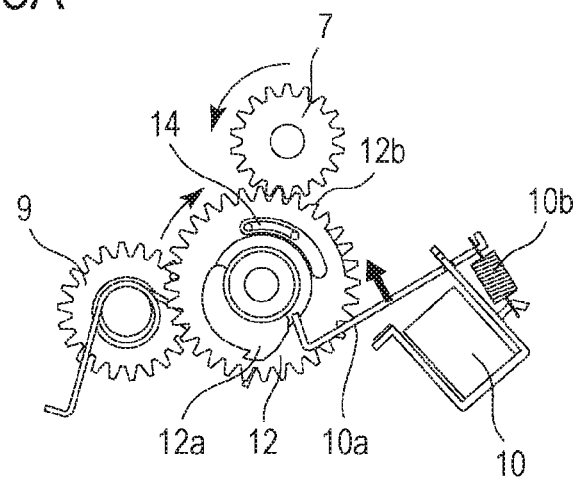
FIG. 13A is an illustration of the second clutch device B2 when viewed from the front side.
Figure 13B:
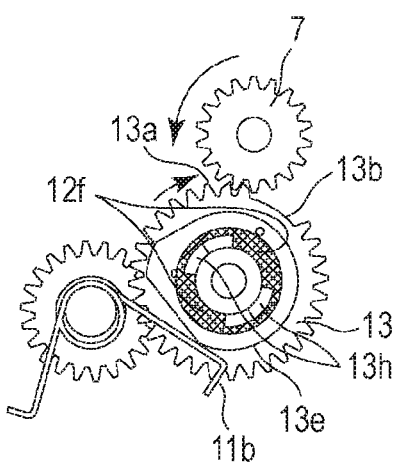
FIG. 13B is a cross-sectional view showing play amounts of the groove portions 12f and the key portions 13h.
Figure 13C:
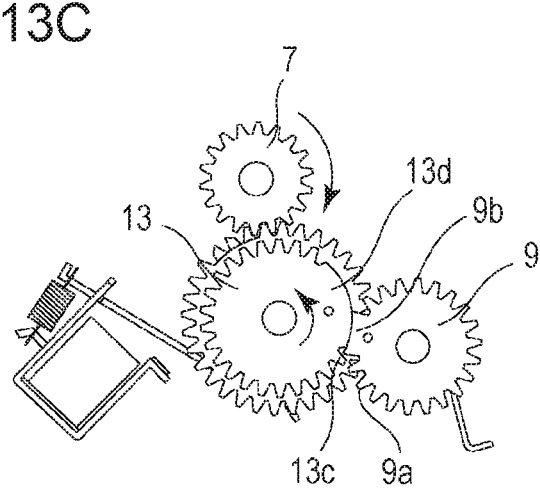
FIG. 13C is an illustration of the second clutch device B2 when viewed from the back side.
Figure 14A:
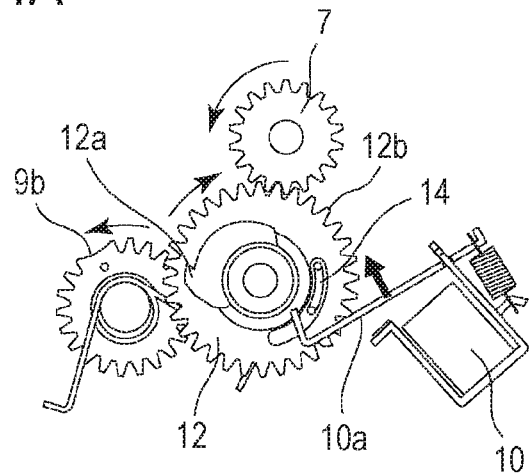
FIG. 14A is an illustration of the second clutch device B2 when viewed from the front side.
Figure 14B:
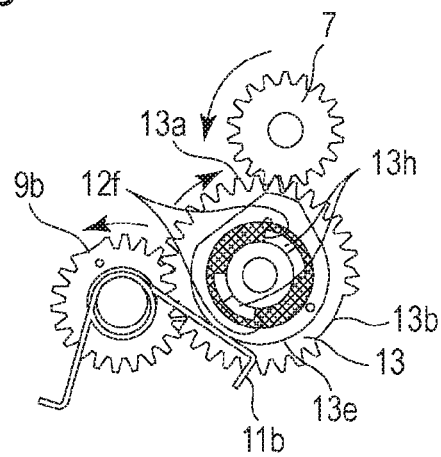
FIG. 14B is a cross-sectional view showing play amounts of the groove portions 12f and the key portions 13h.
Figure 14C:
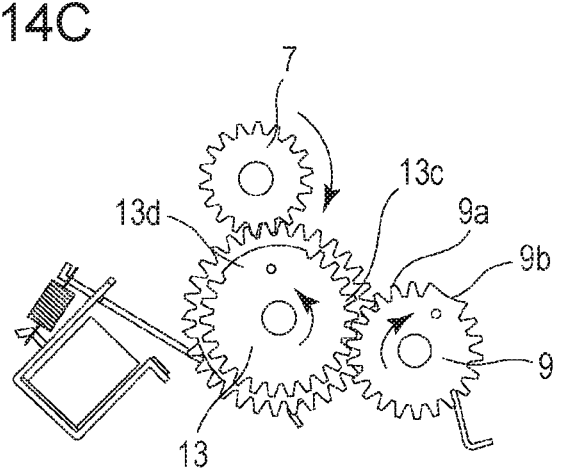
FIG. 14C is an illustration of the second clutch device B2 when viewed from the back side.
Figure 15A:
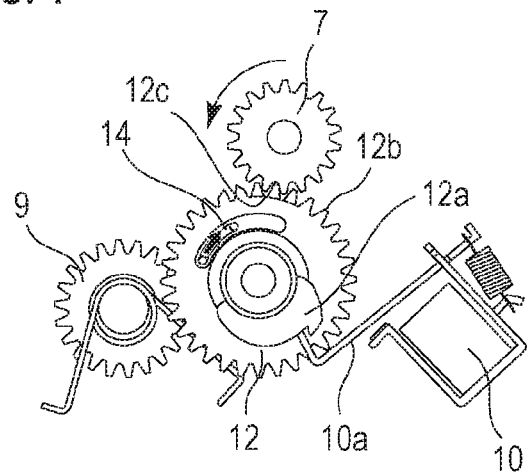
FIG. 15A is an illustration of the second clutch device B2 when viewed from the front side.
Figure 15B:
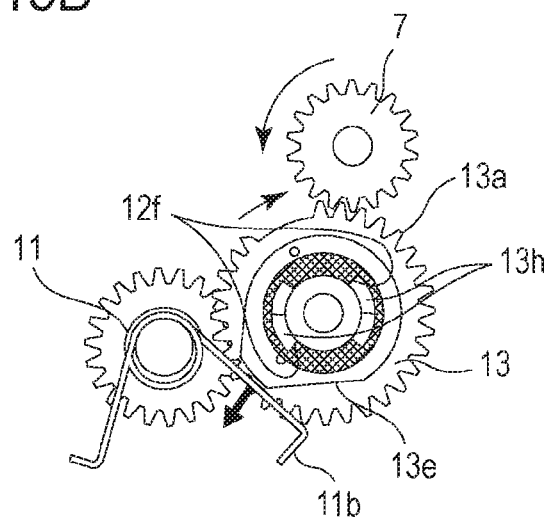
FIG. 15B is a cross-sectional view showing play amounts of the groove portions 12f and the key portions 13h.
Figure 15C:
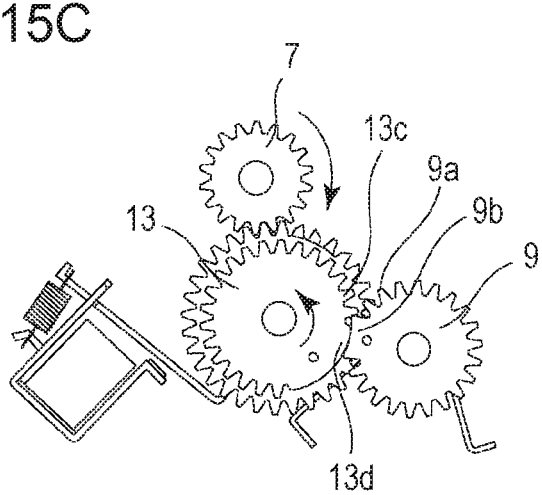
FIG. 15C is an illustration of the second clutch device B2 when viewed from the back side.
Figure 16A:
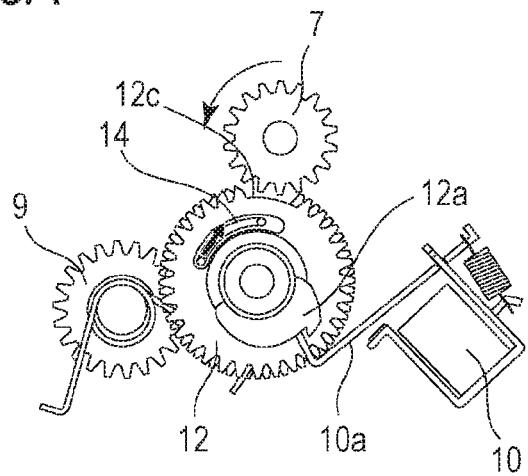
FIG. 16A is an illustration of the second clutch device B2 when viewed from the front side.
Figure 16B:
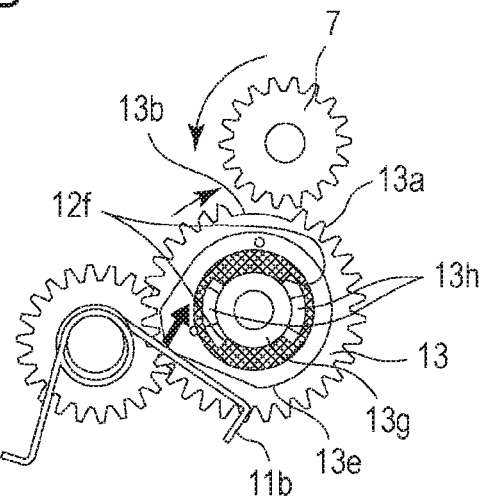
FIG. 16B is a cross-sectional view showing play amounts of the groove portions 12f and the key portions 13h.
Figure 16C:
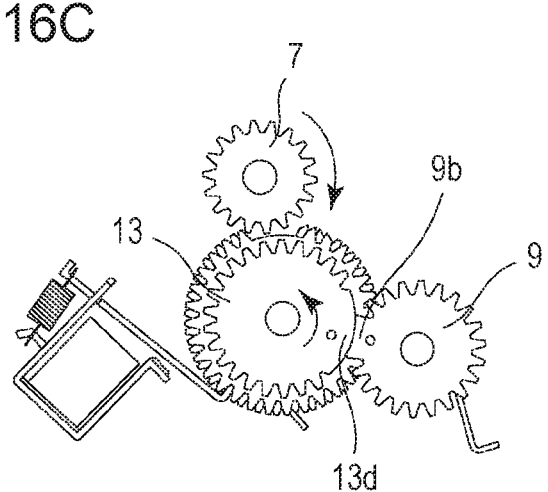
FIG. 16C is an illustration of the second clutch device B2 when viewed from the back side.

Next, a drive transmission operation of the clutch device according to the second embodiment is described with reference to FIGS. 11A to 16C. Each of FIGS. 11A, 12A, 13A, 14A, 15A, and 16A is an illustration of the second clutch device B2 when viewed from the front side (the switch gear 5 side), each of FIGS. 11B, 12B, 13B, 14B, 15B, and 16B is a cross-sectional view showing play amounts between the groove portions 12f of the gear 12 and the key portions 13h of the gear 13 of the second clutch device B2 when viewed from the front side (the switch gear 5 side), and each of FIGS. 11C, 12C, 13C, 14C, 15C, and 16C is an illustration of the second clutch device B2 when viewed from the back side (the side opposite to the switch gear 5 side). FIGS. 11A to 11C show a standby state of the second clutch device B2. FIGS. 12A to 12C show a state at start of rotation of the gear 12 of the second clutch device B2. FIGS. 13A to 13C show a state at start of drive transmission of the second clutch device B2. FIGS. 14A to 14C are explanatory views of a state during drive transmission of the second clutch device B2. FIGS. 15A to 15C show a state at end of drive transmission of the second clutch device B2. FIGS. 16A to 16C show a state immediately before the gear 13 reaches a home position.

In the standby state of the second clutch device B2, as shown in FIG. 11B, the movable arm 11b contacts a flat portion of the cam portion 13e, and urges the flat portion toward the center of the rotating shaft portion 13g of the gear 13. In this state, the gear 13 is at a home position, and the toothless portion 13b faces the gear 7. Accordingly, the driving force from the gear 7 is not transmitted to the gear 13. Also, plays are provided between the groove portions 12f and the key portions 13h.

Also, as shown in FIG. 11A, the gear 12 is urged by the trigger spring 14 to rotate clockwise. However, the retained portion 12a of the gear 12 is retained by the retaining claw 10a and hence the gear 12 is at a stop. In this state, the toothless portion 12c is at a home position, at which the toothless portion 12c faces the gear 7. The driving force of the gear 7 is not transmitted to the gear 12.

Also, as shown in FIG. 11C, the slip portion 13d of the gear 13 contacts the slip portion 9b of the gear 9. In this state, the rotation of the gear 9 is restricted. Even if the rotating shaft 9d being an output target of the driving force receives a rotational torque from the output target, the gear 9 cannot be rotated. At this time, the gear 9 is at a home position.

Then, to execute drive transmission by the second clutch device B2, the gear 12 is rotated first. Accordingly, as shown in FIG. 12A, the solenoid 10 is energized, hence the retaining claw 10a is retracted from the gear 12, and the retention on the retained portion 12a by the retaining claw 10a is released. Then, the boss 12d of the gear 12 is moved toward the boss 13f of the gear 13 by the elastic force of the trigger spring 14, and the gear 12 starts to rotate clockwise. At this time, since the cam portion 13e is pressed by the torsion spring 11, the rotation of the gear 13 is restricted. Accordingly, the gear 13 does not rotate even if the gear 13 receives the elastic force of the trigger spring 14. When the gear 12 rotates by a predetermined amount, the trigger gear 12b meshes with the gear 7, the gear 12 receives the driving force from the gear 7, and the gear 12 rotates.

Also, as shown in FIG. 12B, when the gear 12 rotates by the trigger spring, the gear 13 is held at the standby position by the pressing force of the torsion spring 11 until the plays between the groove portions 12f and the key portions 13h are used up by the rotation of the gear 12. Accordingly, as shown in FIG. 12C, while the gear 13 is at a stop, the slip portion 13d of the gear 13 contacts the slip portion 9b of the gear 9 similarly to FIG. 11C, and the gear 9 stops at the home position without rotating.

When the trigger gear 12b meshes with the gear 7, the gear 12 receives the driving force from the gear 7, and the gear 12 rotates as shown in FIG. 13A, the plays between the groove portions 12f and the key portions 13h are used up as shown in FIG. 13B, and edge portions of the groove portions 12f press the key portions 13h. Accordingly, the gear 13 starts to rotate. Then, the tooth lacking gear 13a of the gear 13 meshes with the gear 7, and the driving force is transmitted from the gear 7 to the gear 13.

After the retention on the retained portion 12a is released and the gear 12 rotates, application of electricity to the solenoid 10 is stopped as shown in FIG. 13A. Accordingly, the retaining claw 10a moves toward the gear 12 by the return spring 10b, and the retaining claw 10a causes the retained portion 12a to be brought into the standby state at the position, at which the retaining claw 10a can retain the retained portion 12a.

Also, when the gear 13 starts to rotate, the slip portion 13d of the first slip gear 13c slides on the slip portion 9b of the second slip gear 9a, and hence the gear 13 starts to rotate without rotating the gear 9.

When the gear 13 rotates by a predetermined amount without rotating the gear 9a, as shown in FIG. 13C, a tooth of the first slip gear 13c next to an end portion at the upstream side of the slip portion 13d in the rotation direction of the gear 13 engages with an end portion of the slip portion 9b, and the gear 9 starts to rotate. Accordingly, a tooth of the first slip gear 13c bites into a tooth of the second slip gear 9a, the second slip gear 9a meshes with the first slip gear 13c, and hence the gear 9 rotates.

When the gear 9 starts to rotate, the switch gear 5 starts to rotate, the driving force is transmitted to the switch cam 4 through the switch gear 5, and hence the switch cam 4 starts to rotate.

Then, as shown in FIG. 14A, the trigger gear 12b of the gear 12 meshes with the gear 7 and the gear 12 rotates. As shown in FIG. 14B, the tooth lacking gear 13a of the gear 13 meshes with the gear 7 and the gear 13 rotates. Also, as shown in FIG. 14C, the second slip gear 9a of the gear 9 meshes with the first slip gear 13c of the gear 13 and rotates. Accordingly, the switch gear 5 rotates, and the switch cam 4 rotates. As described above, when the driving force is transmitted from the gear 9 to the switch cam 4 to rotate the switch cam 4, the gear 13 meshes with the gear 7 and the driving force from the motor M is transmitted to the gear 9.

Immediately before the gear 12 rotates by one rotation, as shown in FIG. 15A, since the toothless portion 12c of the trigger gear 12b faces the gear 7 and the trigger gear 12b does not mesh with the gear 7, the gear 12 no longer receives the driving force from the gear 7. At this time, also as shown in FIG. 15B, since the gear 13 meshes with the gear 7 and rotates, the boss 13f of the gear 13 presses the boss 12d through the trigger spring 14 with a natural length, and hence the gear 12 rotates. Then, when the gear 12 rotates by one rotation, the retained portion 12a contacts the retaining claw 10a and is retained. Accordingly, the gear 12 stops at the home position.

Also, as shown in FIG. 15B, while the gear 13 meshes with the gear 7 and rotates, the cam portion 13e presses the movable arm 11b against the elastic force of the torsion spring 11, compresses the torsion spring 11, and charges the elastic force.

Since the plays are provided again between the groove portions 12f and the key portions 13h when the gear 12 is retained by the retaining claw 10a and stops, the gear 13 is rotatable by a predetermined amount while the gear 12 stops.

Also, as shown in FIG. 15C, while the gear 13 meshes with the gear 7 and rotates, the meshing between the first slip gear 13c and the second slip gear 9a is ended by the rotation of the gear 13, and the slip portion 13d faces the slip portion 9b. Accordingly, the gear 9 does not receive the driving force transmitted from the gear 13, the rotation of the gear 9 is stopped, and the gear 9 is arranged at the home position again. As described above, the gear 9 is rotated by one rotation by the gear 13, and the rotation of the gear 9 is stopped. Since the gear 9 stops in this way, the driving force is no longer transmitted to the gear 9 and the drive train arranged downstream of the gear 9, the switch gear 5 and the switch cam 4 also stop.

Then, the gear 13 receives the driving force from the gear 7 and rotates. At this time, since the gear 12 is at a stop, the key portions 13h move in the groove portions 12f. Then, as shown in FIG. 16B, the toothless portion 13b faces the gear 7, the tooth lacking gear 13a cannot mesh with the gear 7, and the gear 13 no longer receives the driving force from the gear 7. At this time, if the toothless portion 13b stops before moving to the position, at which the toothless portion 13a completely faces the gear 7, sound may be generated by slight collision between the rotating gear 7 and a tooth tip of the tooth lacking gear 13a. To avoid this, the gear 13 is further rotated without the driving force from the gear 7. To be specific, the gear 13 is rotated by pressing the cam portion 13e by the elastic force of the torsion spring 11, so that the toothless portion 13b completely faces the gear 7 and the teeth of the tooth lacking gear 13b are sufficiently retracted from the gear 7 in the rotation direction of the gear 13. The gear 13 rotates to a position, at which the gear 13 is no longer rotated by the pressure on the cam portion 13e with the movable arm 11b due to the elastic force of the torsion spring 11, and the gear 13 stops. Accordingly, the gear 13 is located at the home position shown in FIG. 11B. The position, at which the gear 13 no longer rotates by the pressure on the cam portion 13e with the movable arm 11b due to the elastic force of the torsion spring 11, is a position at which the movable arm 11b contacts the flat portion of the cam portion 13e and hence the pressing force of the movable arm 11b does not act as a rotational moment of the gear 13.

Also, while the gear 13 rotates in the state in which the rotation of the gear 12 stops (while the key portions 13h move in the groove portions 12f), the boss 13f of the gear 13 moves away from the boss 12d of the gear 12. Accordingly, the trigger spring 14 is expanded and the elastic force is charged. Accordingly, as shown in FIGS. 12A to 12C, when the retention on the retained portion 12a by the retaining claw 10a is released, the gear 12 can be rotated.

Also, as shown in FIG. 16C, while the gear 13 is rotated to the home position only by the elastic force of the torsion spring 11, the slip portion 13d of the gear 13 slides on the slip portion 9b. The gear 13 rotates to the home position without rotating the gear 9 and stops. This is because the slip portion 13d of the gear 13 faces the slip portion 9b of the gear 9 before the timing at which the tooth lacking gear 13a no longer meshes with the gear 7, and the driving force of the gear 13 is no longer transmitted to the gear 9.

With this embodiment, in the second clutch device B2, while the gear 13 cannot obtain the driving force from the gear 7 and the gear 13 is rotated only by the elastic force of the torsion spring 11, the gear 13 is rotatable without rotating the gear 9. That is, in a period from when the meshing between the tooth lacking gear 13a and the gear 7 is ended to when the gear 13 stops, the gear 13 is rotated only by the elastic force of the torsion spring 11. During this period, the slip portion 13d of the gear 13 faces the slip portion 9b of the gear 9. The gear 13 is rotatable without transmitting the driving force to the gear 9 and the drive train arranged downstream of the gear 9, and rotating the gear 9 and the downstream drive train.

Accordingly, the elastic force of the torsion spring 11 that rotates the gear 13 when the gear 13 cannot obtain the driving force from the gear 7 can be merely a force that is larger than the total sum of a rotational resistance force of the gear 13, such as a frictional force, and a force of rotating the gear 13 by a predetermined amount against the elastic force of the trigger spring 14. Accordingly, as compared with the configuration of related art described in PTL 1 and the like, the elastic force of the torsion spring 11 can be decreased. Similarly to the first embodiment, the increase in size and cost of the apparatus can be avoided. Also, the sound which is generated because the elastic member collides with the driven rotational body when the elastic member presses the driven rotational body, and the sound which is generated because the driven rotational body rotated by the elastic member collides with the retaining claw can be decreased.

Also, the ease of assembly and workability are less degraded, and the driving force required for the drive source (the motor M) can be decreased. Accordingly, a low-output, inexpensive, and small drive source can be used.

Also, while the gear 9 is at the home position and the gear 13 rotates by the elastic force of the torsion spring 11, even if the drive train from the second slip gear 9a to the switch cam 4 is to be rotated by an external force or the like, the rotation of the drive train is restricted.

The configuration of the above-described embodiment can be modified into other configurations similar to those described in the first embodiment.

Third Embodiment

Third Clutch Device B3

Figure 18:
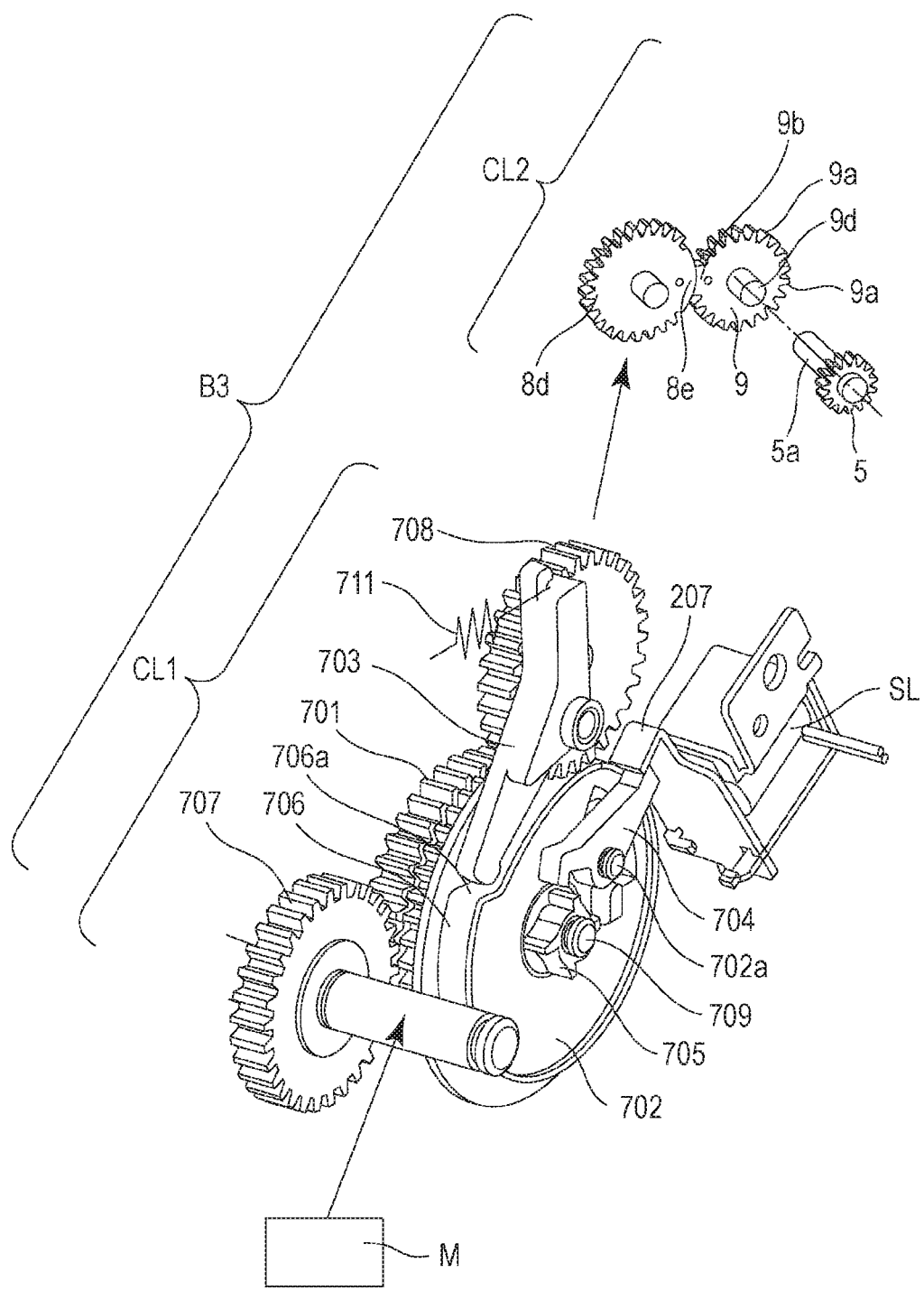
FIG. 18 is a perspective view of a third clutch device B3.

Next, a third clutch device B3 as a drive transmission device according to a third embodiment of the present invention is described with reference to FIGS. 18, 19A, 19B, 20A, and 20B. Similar reference signs are applied to configurations similar to those in the above-described first embodiment, and the description is omitted. FIG. 18 is an illustration explaining overview of the third clutch device B3. The third clutch device B3 is provided in a drive train through which the driving force from the motor M is transmitted, and includes a first clutch section CL1, and a second clutch section CL2 that receives the driving force transmitted from the first clutch section CL1 and transmits the driving force to the switch gear 5.

The configuration of the second clutch section CL2 is similar to the first slip gear 8d and gear 9 according to the first embodiment.

The first clutch section CL1 includes an input gear 701 integrally formed with a drive transmission claw (a driving rotational body) 705, an output gear (a driven rotational body) 702, a pressing lever 703, and a solenoid SL. The input gear 701 is rotated by a gear 707 that rotates when receiving the driving force transmitted from the motor M. Also, the driving force is transmitted from the output gear 702, through a gear 708 and an idler gear (not shown), to the first slip gear 8d of the second clutch section CL2. The first slip gear 8d rotates in synchronization with the output gear 702. The gear ratio of the output gear 702 to the first slip gear 8d is 1:1.

The input gear 701 and the output gear 702 are rotated together coaxially around a rotation center 709. The output gear 702 holds a drive transmission lever (an engagement member) 704 that can engage with the drive transmission claw 705. The drive transmission lever 704 held by the output gear 702 swings around a shaft 702a different from the rotation center 709. The drive transmission lever 704 is movable between a position at which the drive transmission lever 704 engages with the drive transmission claw 705 and a position at which the drive transmission lever 704 is retracted from the drive transmission claw 705 and does not engage with the drive transmission claw 705. A cam portion 706 having a cam surface 706a is integrally formed on the outer periphery of the output gear 702. The pressing lever (a pressing member) 703 being pulled by a spring 711 presses the cam surface 706a, and hence the pressing lever 703 applies a rotational force to the output gear 702. The cam portion is rotatable together with the output gear 702.

Operation of Third Clutch Device B3

Next, a drive transmission operation of the third clutch device B3 is described with reference to FIGS. 19A to 20B which are illustrations of the drive transmission device when viewed from the axial direction of the rotation center 709.

Figure 19A:
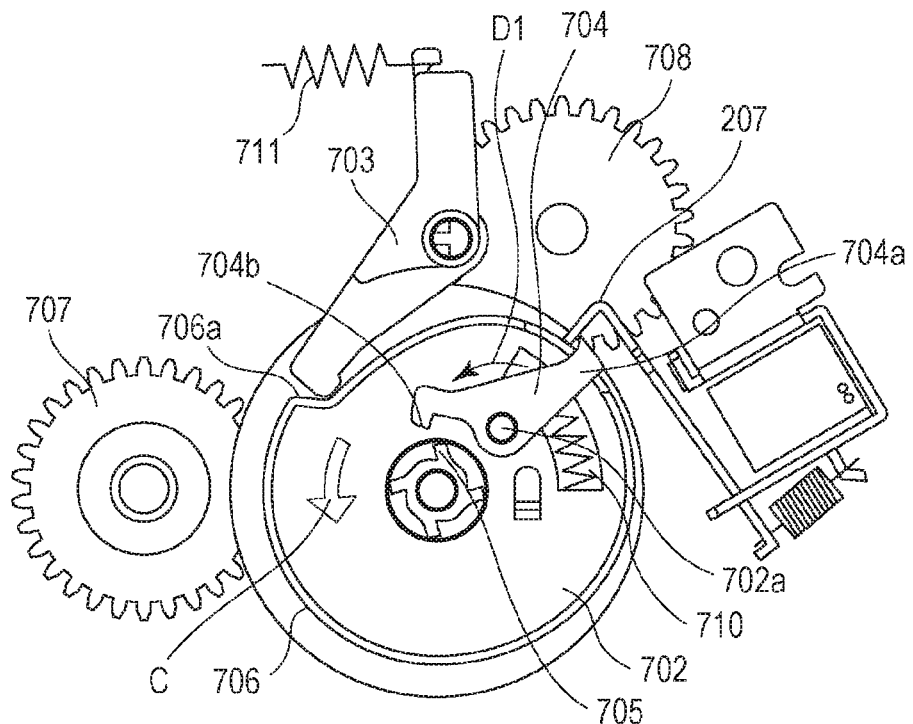
FIG. 19A is an illustration showing the third clutch device B3.

In a standby state of the third clutch device B3, as shown in FIG. 19A, the solenoid SL is not energized, and a flapper 207 being a retaining member that retains the drive transmission lever 704 retains the drive transmission lever 704 in the first clutch section CL1. At this time, the drive transmission lever 704 is at an engagement release position at which the engagement between the drive transmission claw 705 and the drive transmission lever 704 is released. Accordingly, drive is not transmitted from the input gear 701 to the output gear 702, the output gear 702 stops at a home position, and only gears, such as the input gear 701 and the gear 707, arranged at the upstream side in the drive transmission direction rotate. The input gear 701 rotates in an arrow C direction.

At this time, in the second clutch section CL2, the first slip gear 8d and the gear 9 are at a stop in a state similar to that shown in FIG. 3B.

Figure 19B:
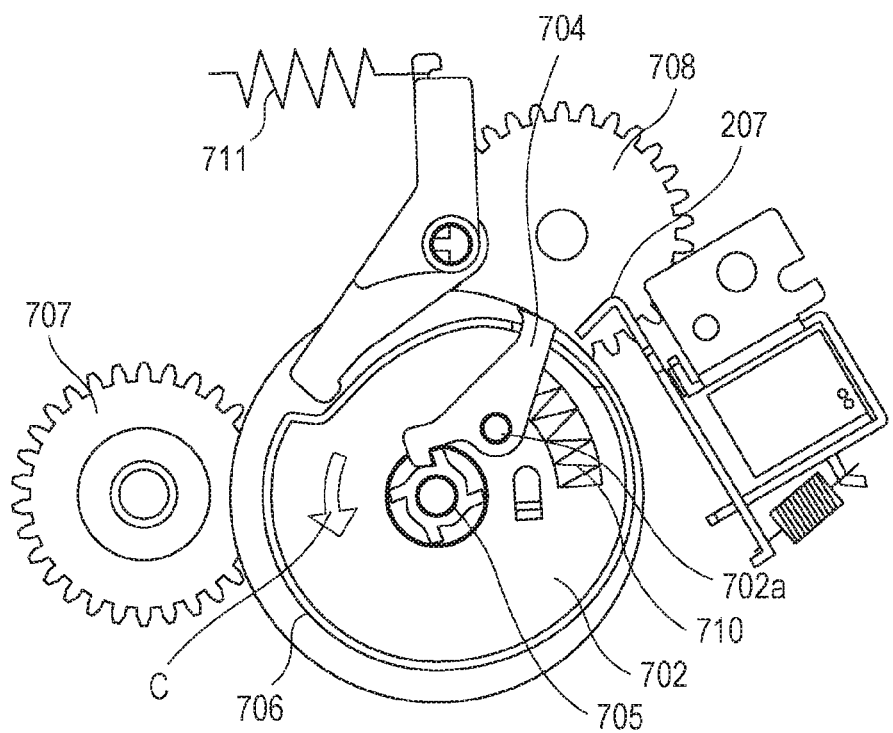
FIG. 19B is an illustration showing the third clutch device B3.

Next, start of drive transmission of the third clutch device B3 is described. In the first clutch section CL1, the solenoid SL is energized, the flapper 207 is retracted from the drive transmission lever 704, and the retention between the drive transmission lever 704 and the flapper 207 is released. Then, a spring 710 provided between the output gear 702 and the drive transmission lever 704 presses the drive transmission lever 704 to turn the drive transmission lever 704 in an arrow D1 direction. The drive transmission lever 704 moves to the engagement position and engages with the drive transmission claw 705. With this engagement, as shown in FIG. 19B, the input gear 701 and the output gear 702 are coupled to each other through the drive transmission lever 704, the input gear 701 and the output gear 702 start to rotate together in the arrow C direction, and the driving force is transmitted from the output gear 702 to the drive output gear 708. The reason that the spring 710 presses the drive transmission lever 704 is described later.

At this time, in the second clutch section CL2, the first slip gear 8d and the gear 9 are at a stop in a state similar to that shown in FIG. 4B.

Then, in the first clutch section CL1, the input gear 701 and the output gear 702 are coupled to each other and rotate together in the arrow C direction. During this period, application of electricity to the solenoid SL is stopped, and the retracted flapper 207 is in a state restored to a retention position at which the flapper 207 can retain the drive transmission lever 704.

At this time, in the second clutch section CL2, the first slip gear 8d and the gear 9 mesh with each other and rotate in a state similar to that shown in FIG. 5B.

Then, immediately before the output gear 702 rotates substantially by one rotation from the home position, as shown in FIG. 6B, the meshing between the first slip gear 8d and the second slip gear 9a is ended, and the slip portion 8e faces the slip portion 9b. Accordingly, the gear 9 does not receive the driving force transmitted from the first slip gear 8d, the rotation of the gear 9 is stopped, and the gear 9 is arranged at the home position again. As described above, the gear 9 is rotated by one rotation by the first slip gear 8d, and the rotation of the gear 9 is stopped. Since the gear 9 stops in this way, the driving force is no longer transmitted to the drive train of the gear 9 and other components arranged downstream of the gear 9, the switch gear 5 and the switch cam 4 also stop. At this time, in the first clutch section CL1, the output gear 702 and the input gear 701 are coupled to each other and rotate together.

Figure 20A:
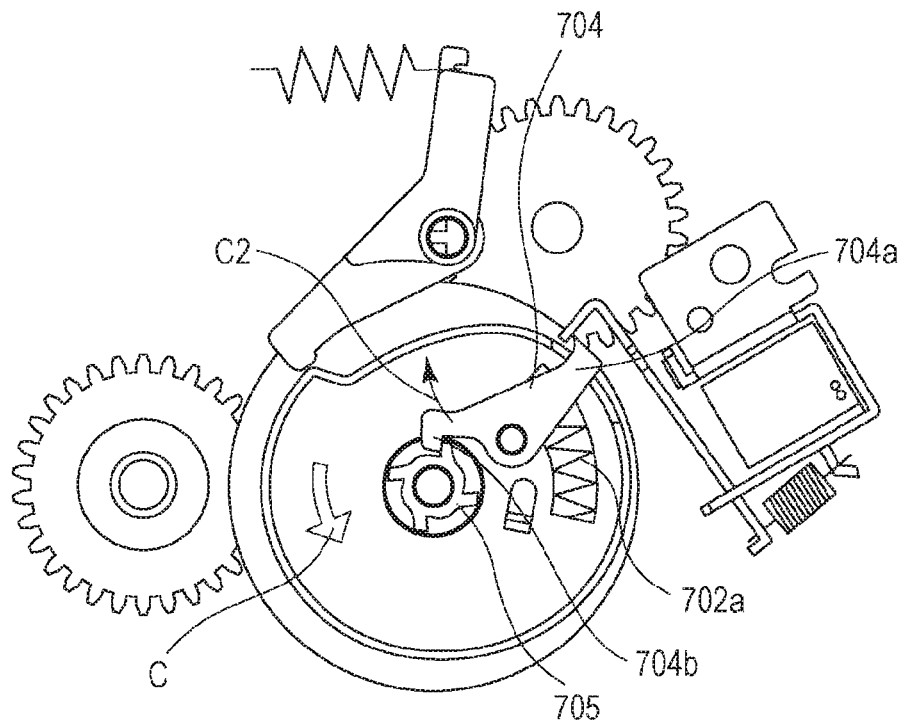
FIG. 20A is an illustration showing the third clutch device B3.

Then, in the first clutch section CL1, as shown in FIG. 20A, when the drive transmission lever 704 rotating together with the output gear 702 is returned to the position at which the drive transmission lever 704 contacts the flapper 207, a first end portion 704a of the drive transmission lever 704 is retained by the flapper 207. Since a second end portion 704b of the drive transmission lever 704 engages with the drive transmission claw 705 at an instance when the first end portion 704a contacts the flapper 207, the drive transmission lever 704 is pulled by the drive transmission claw 705. Accordingly, the drive transmission lever 704 turns in a C2 direction around the first end portion 704a, which contacts the flapper 207, as a support point until the engagement between the second end portion 704b and the drive transmission claw 705 is released. When the engagement is released, the driving force is no longer transmitted from the drive transmission claw 705 to the output gear 702. When the output gear 702 stops at this time, the drive transmission lever 704 cannot be further retracted from the drive transmission claw 705. Hence, at the time when the output gear 702 stops, the drive transmission lever 704 may be in a state in which the drive transmission lever 704 is not retracted by a sufficient distance from the drive transmission claw 705. In this situation, the second end portion 704b of the drive transmission lever 704 may collide with a tip end of the continuously rotating drive transmission claw 705 and sound may be generated, resulting in generation of noise.

Figure 20B:
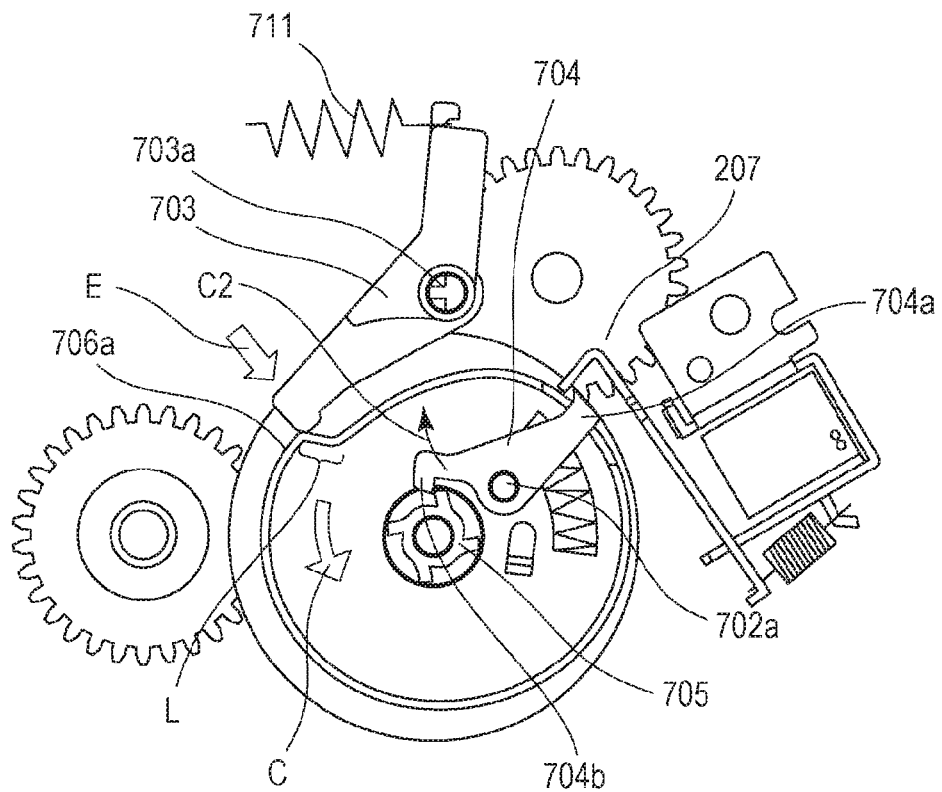
FIG. 20B is an illustration showing the third clutch device B3.

Therefore, in this embodiment, as shown in FIG. 20B, the pressing lever 703 being urged by the spring 711 presses the cam surface 706a of the cam portion 706, applies the rotational force to the output gear 702, and rotates the output gear 702. Then, by the rotation of the output gear 702, the drive transmission lever 704 is retracted from the drive transmission claw 705 by a sufficient distance. The pressing lever 703 can turn around a shaft 703a.

To be more specific, in the state in which the first end portion 704a of the drive transmission lever 704 contacts the flapper 207, and the second end portion 704b of the drive transmission lever 704 engages with the drive transmission claw 705, a tip end of the pressing lever 703 presses an inclined portion L of the cam surface 706a in an arrow E direction. By pressing the inclined portion L of the cam surface 706a as described above, the rotational force is applied to the output gear 702 and the output gear 702 is rotated in the C direction. By the rotation of the output gear 702, the shaft 702a also rotates in the C direction around the rotation center 709. With this rotational force, the drive transmission lever 704 is turned in the D2 direction around the first end portion 704a serving as the support point. Even after the engagement between the second end portion 704b and the drive transmission claw 705 is released, the drive transmission lever 704 is further turned in the D2 direction. Accordingly, the second end portion 704b of the drive transmission lever 704 can be retracted from the drive transmission claw 705 by a sufficient distance.

The length and inclination of the inclined portion L of the cam surface 706a is set so that the rotation of the output gear 702 is stopped at the home position being a proper position at which the second end portion 704b of the drive transmission lever 704 is at a sufficient distance from the drive transmission claw 705.

In this way, the drive transmission lever 704 is retracted from the drive transmission claw 705. When this retraction operation of the drive transmission lever 704 is viewed from the output gear 702, the drive transmission lever 704 rotates around the shaft 702a so that the second end portion 704b is separated from the drive transmission claw 705. At this time, the drive transmission lever 704 presses and compresses the spring 710 while turning. Hence, when the output gear 702 stops, the spring 710 is in a pressed and compressed state. When the flapper 207 releases the retention on the drive transmission lever 704, the spring 710 is released as described above, and the spring 710 presses and turns the drive transmission lever 704.

As described above, while the pressing lever 703 presses the cam portion 706 by the elastic force of the spring 711 and hence the output gear 702 is rotated to the home position in the first clutch section CL1, the second clutch section CL2 is in a state similar to that shown in FIG. 7B. That is, the first slip gear 8d rotates without rotating the gear 9. This is because the slip portion 8e of the first slip gear 8d faces the slip portion 9b of the gear 9 before the timing at which the drive transmission lever 704 is retracted from the drive transmission claw 705, and the driving force of the first slip gear 8d is no longer transmitted to the gear 9.

As described above, in this embodiment, while the output gear 702 cannot obtain the driving force from the drive transmission claw 705 and the output gear 702 is rotated by pressing the cam portion 706 with the pressing lever 703 due to the elastic force of the spring 711 in the first clutch section CL1, the first slip gear 8d is rotatable without rotating the gear 9 in the second clutch section CL2. That is, in a period from when the engagement between the drive transmission lever 704 and the drive transmission claw 705 of the output gear 702 is released to when the output gear 702 stops, the output gear 702 is rotated only by the elastic force of the spring 711. During this period, the slip portion 8e of the first slip gear 8d faces the slip portion 9b of the gear 9. The first slip gear 8d is rotatable without transmitting the driving force to the gear 9 and the drive train arranged downstream of the gear 9, and rotating the gear 9 and the downstream drive train.

Hence, the elastic force of the spring 711 for rotating the output gear 702 when the output gear 702 cannot obtain the driving force from the drive transmission claw 705 can be merely a force that is larger than a rotational resistance force of the drive train from the output gear 702 to the first slip gear 8d, such as a frictional force. Accordingly, the elastic force of the spring 711 can be decreased, and the increase in size and cost of the apparatus can be avoided similarly to the first embodiment. Also, the sound which is generated because the elastic member collides with the driven rotational body when the elastic member presses the driven rotational body, and the sound which is generated because the driven rotational body rotated by the elastic member collides with the retaining claw can be decreased.

Also, the ease of assembly and workability are less degraded, and the driving force required for the drive source (the motor M) can be decreased. Accordingly, a low-output, inexpensive, and small drive source can be used.

Also, while the gear 9 is at the home position and the output gear 702 rotates by the elastic force of the torsion spring 711, even if the drive train from the second slip gear 9a to the switch cam 4 is to be rotated by an external force or the like, the rotation of the drive train is restricted.

The configuration of the above-described embodiment can be modified into other configurations similar to those described in the first embodiment.

Fourth Embodiment

Next, a drive transmission device DR according to a fourth embodiment of the present invention, and an image forming apparatus 200 including the drive transmission device DR are described.

Image Forming Apparatus

First, a schematic configuration of the image forming apparatus according to this embodiment and a flow of an image forming operation are described with reference to FIG. 38.

Figure 38:
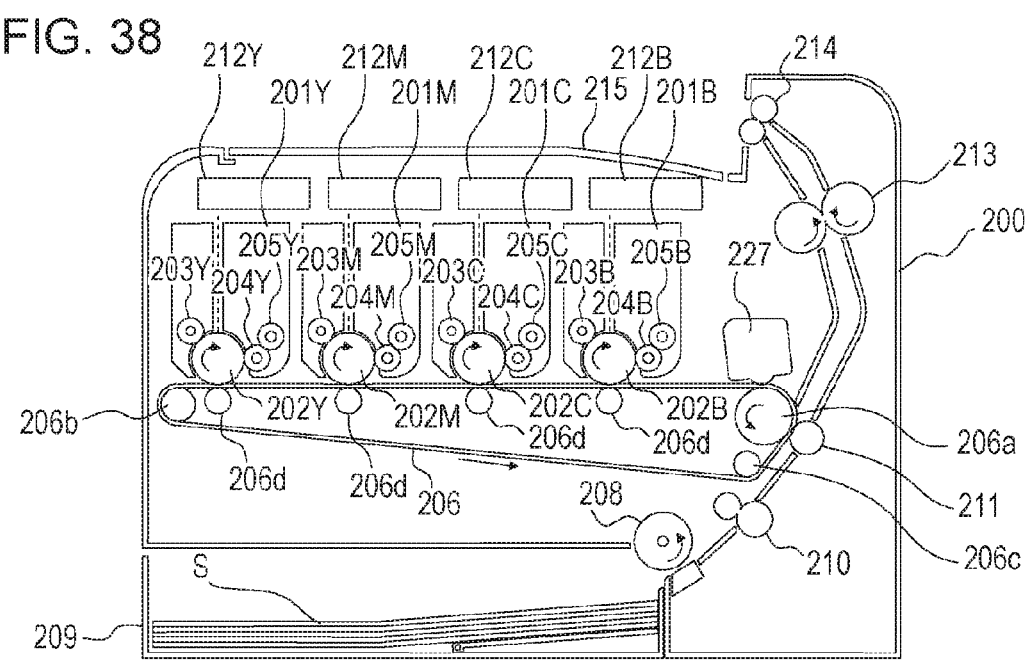
FIG. 38 is a schematic cross-sectional view of a color laser beam printer.

FIG. 38 is a schematic cross-sectional view showing a general configuration of a full-color laser beam printer 200 (hereinafter, referred to as "image forming apparatus 200") including image forming units configured to respectively form images of four colors (yellow Y, magenta M, cyan C, black Bk).

As shown in FIG. 38, the image forming apparatus 200 includes four cartridges 201 (201Y, 201M, 201C, 201B) arranged in parallel in the horizontal direction. The cartridges 201 are integrally provided with photosensitive drums 202 (202Y, 202M, 202C, 202B) as image bearing bodies, charging rollers 203 (203Y, 203M, 203C, 203B) respectively arranged around the photosensitive drums 202 and configured to respectively uniformly charge the surfaces of the photosensitive drum 202 with electricity, and developing rollers 204 (204Y, 204M, 204C, 204B) as developing members that respectively cause toners to adhere to the photosensitive drums 202 and develop the toners as toner images. Also, toners with predetermined colors (not shown) are respectively housed in the cartridges 201. The toners are respectively supplied to the surfaces of the developing rollers 204 by rotation of supply rollers 205 (205Y, 205M, 205C, 205B).

A belt 206 is an endless-belt-shaped image bearing body that is wound around a driving roller 206a, a driven roller 206b, and a tension roller 206c. The belt 206 serves as an intermediate transfer body that can bear toner images on its surface. Also, the belt 206 is rotationally driven when the driving roller 206a rotates counterclockwise, and the surface of the belt 206 is moved.

Four first transfer rollers 206d and a cleaning device 227 are arranged around the belt 206. The first transfer rollers 206d are arranged at positions at which the first transfer rollers 206d respectively face the photosensitive drums 202, and respectively transfer the toner images on the surface of the photosensitive drums 202 onto the belt 206. The cleaning device 227 removes a transfer remaining toner remaining on the surface of the belt 206.

An image forming operation on a recording material S is described. The image forming apparatus 200 rotates a sheet feed roller 208 counterclockwise, hence feeds sheets of the recording material S in a cassette 209 one by one, and conveys the recording material S to a registration roller 210. The recording material S is conveyed to a second transfer roller 211, in synchronization with a formation operation of toner images to be formed on the surface of the belt 206, by using the registration roller 210.

Meanwhile, in synchronization with the operation of feeding the recording material S, the photosensitive drums 202 are uniformly charged with electricity by the charging rollers 203 while rotating clockwise. Further, the photosensitive drums 202 are exposed to light by laser scanners 212 (212Y, 212M, 212C, 212B) that emit light in accordance with image signals while the photosensitive drums 202 rotate clockwise, and electrostatic latent images are formed.

The electrostatic latent images of the photosensitive drum 202 are developed by the developing rollers 204 and hence are visualized as toner images. The photosensitive drums 202 contact the belt 206, and the toner images on the surfaces of the photosensitive drums 202 are sequentially transferred by overlap transfer on the belt 206 by the first transfer rollers 206d.

Then, the toner image developed in an overlap manner on the belt 206 is moved together with the belt 206 to the driving roller 206a and the second transfer roller 211, and then the toner image is second transferred on the recording material S. The toner image transferred on the recording material S is conveyed to a fixing roller pair 213 being toner fixing means. The toner image is heated and pressed, and hence is fixed to the recording material S when passing through a nip portion of the fixing roller pair 213. Then, the recording material S is output onto a sheet output tray 215 at an upper section of the image forming apparatus 200 through a sheet output roller pair 214 so that a toner image surface faces the lower side. The image forming operation is ended.

In the following description, a configuration of the cartridge 201B and a drive transmission configuration to the cartridge 201B are described. However, this description can be similarly applied to the other cartridges 201Y, 201M, and 201C.

Cartridge Driving Configuration

Figure 39:
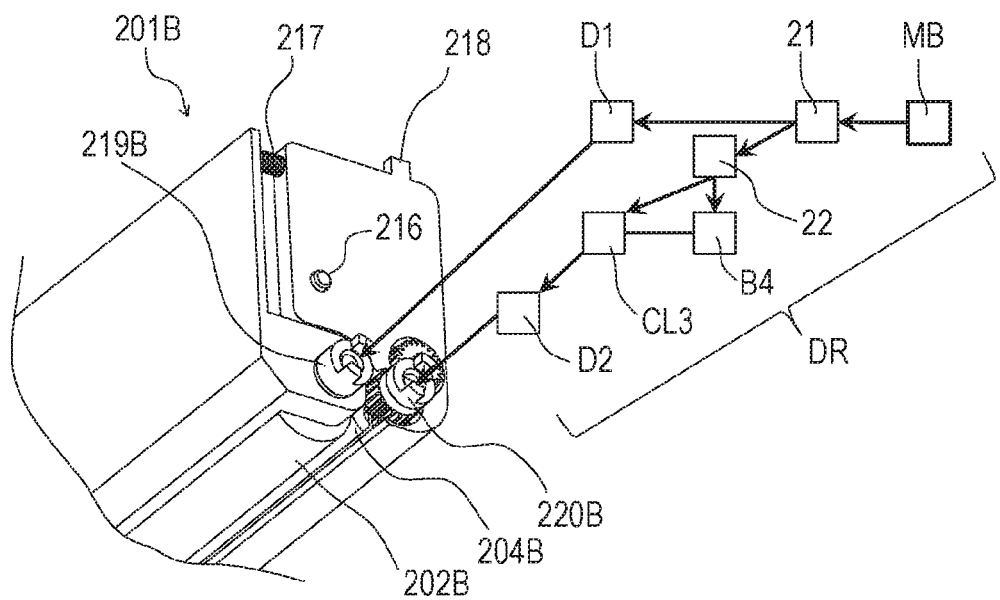
FIG. 39 is an illustration showing a drive transmission configuration to a cartridge.

Next, a method of driving the photosensitive drum 202 and the developing roller 204 in the cartridge 201 is described with reference to FIG. 39. FIG. 39 is an illustration showing the drive transmission configuration to the cartridge 201B of black Bk. FIG. 39 includes a cartridge 201B portion illustrated in a perspective view, and a drive transmission device DR portion illustrated in a conceptual diagram.

As shown in FIG. 39, the cartridge 201B includes a support shaft 216 that supports the developing roller 204B so that the developing roller 204B can swing relative to the photosensitive drum 202B, a pressure spring 217, and a rib 218. The developing roller 204B is urged to contact the photosensitive drum 202B by the pressure spring 217 around the support shaft 216 as the rotation center. In the cartridge 201B, the developing roller 204B contacts the photosensitive drum 202B during the image forming operation, and the developing roller 204B is separated from the photosensitive drum 202B in a situation other than the image forming operation. The contact state of the developing roller 204B with the photosensitive drum 202B is held by an urging force of the pressure spring 217. When the developing roller 204B is separated from the photosensitive drum 202B, the rib 218 is pressed, moved, and fixed by a contact/separate mechanism (not shown) in a direction against the urging force of the pressure spring 217. Accordingly, the separated state of the developing roller 204B from the photosensitive drum 202 is held.

A drum coupling member 219B and a development coupling member 220B are respectively provided at end portions of the rotating shafts of the photosensitive drum 202B and the developing roller 204B. The other cartridges 201Y, 201M, and 201C are configured similarly to the above-described cartridge 201B.

The cartridge 201B obtains a driving force from a motor MB being a drive source. The other cartridges 201Y, 201M, and 201C are also provided with corresponding motors. A rotational force output from the motor MB is divided into a drum driving shaft D1 and a development driving shaft D2 (described later), the drum driving shaft D1 engages with the drum coupling member 219B, and the rotational force drives the photosensitive drum 202B. Also, the development driving shaft D2 engages with the development coupling member 220B, and hence the rotational force drives the developing roller 204B.

In the middle of the drive transmission from the motor MB to the development driving shaft D2, a fourth clutch device B4 and a third clutch section CL3 (described later) are arranged. By operating the fourth clutch device B4 at a predetermined timing, the third clutch section CL3 is switched between a drive transmission state (hereinafter, referred to as ON state) and a drive cut-off state (hereinafter, referred to as OFF state). By the switching between the drive transmission state and the drive cut-off state, switching between rotation and stop of the development driving shaft D2 is provided. When the developing roller 204B contacts the photosensitive drum 202B, the fourth clutch device B4 operates the third clutch section CL3 to transmit the driving force of the motor MB to the development driving shaft D2, so that the developing roller 204B is rotated. Also, when the developing roller 204B is separated from the photosensitive drum 202B, the third clutch section CL3 is operated to cut off the driving force of the motor MB to the development driving shaft D2, so that the rotation of the developing roller 204B is stopped.

Drive Transmission to Drum

Figure 21A:
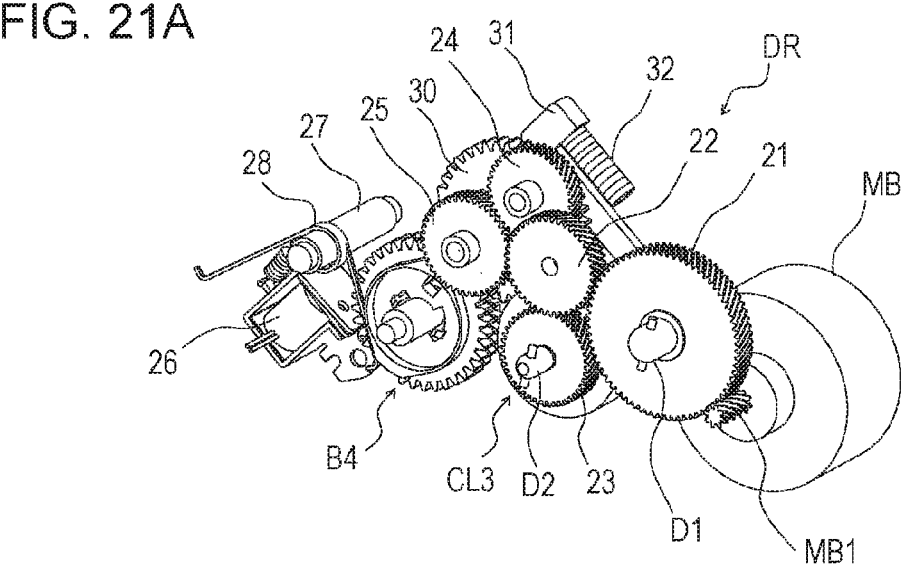
FIG. 21A is a perspective view of a drive transmission device DR when viewed from the front side.
Figure 21B:
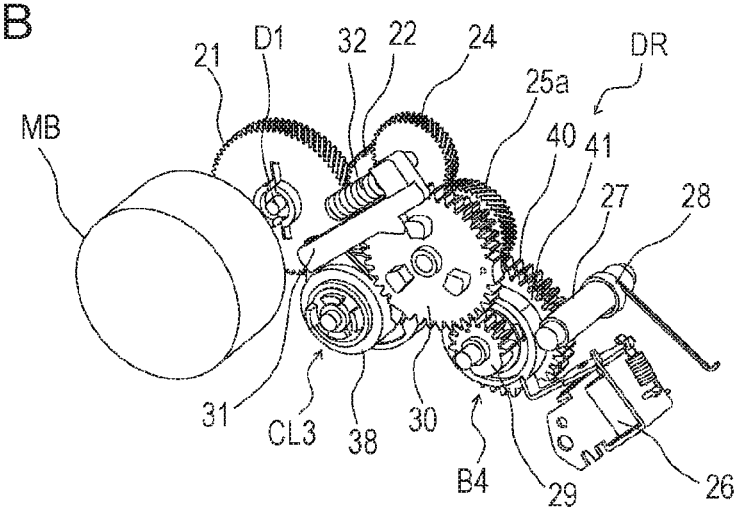
FIG. 21B is a perspective view showing the drive transmission device DR when viewed from the back side.
Figure 22:
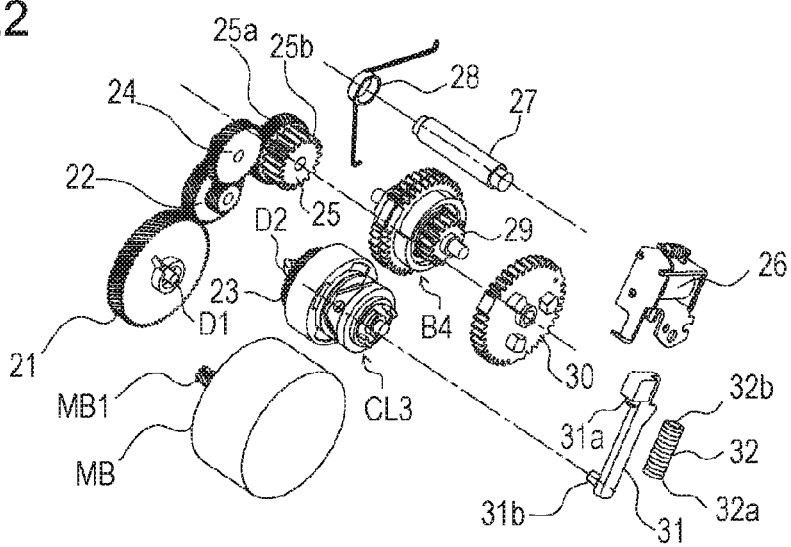
FIG. 22 is a perspective view of the drive transmission device DR before assembly.

The configuration of transmitting the driving force from the motor MB to the driving shaft D1 and the driving shaft D2 is described with reference to FIGS. 21A, 21B, and 22. FIG. 21A and FIG. 21B are perspective views of the drive transmission device DR. FIG. 21A is an illustration of the drive transmission device DR when viewed from the cartridge 201B. FIG. 21B is an illustration of the drive transmission device DR when viewed from a side opposite to the cartridge 201B. Hereinafter, it is assumed that the cartridge 201B side of the drive transmission device DR is "the front side of the drive transmission device DR" and the side opposite to the cartridge 201B is "the back side of the drive transmission device DR." FIG. 22 is a perspective view of the drive transmission device DR before assembly.

The drive transmission device DR includes a motor MB being a drive source, a drum gear 21, and the above-described drum driving shaft D1. The drum driving shaft D1 is coaxially coupled to the drum gear 21. A motor shaft MB1 meshes with the drum gear 21. Drive from the motor MB rotates the drum driving shaft D1 through the motor shaft MB1 and then the drum gear 21. Accordingly, when the drum driving shaft D1 engages with a drum coupling member 19B and the motor MB rotates, the drum 202B constantly rotates.

Drive Transmission to Developing Roller

Next, a configuration that transmits the driving force from the motor MB to the development driving shaft D2 is described. The drive transmission device DR includes a first idler gear 22 that can mesh with the drum gear 21, and the third clutch section CL3 having a clutch gear 23 that can mesh with the first idler gear 22. The third clutch section CL3 includes the driving shaft D2 that can engage with the development coupling member 220B as described above. Accordingly, drive from the motor MB constantly rotates the first idler gear 22 and the clutch gear 23 from the motor shaft MB1 through the drum gear 21.

When the development driving shaft D2 engages with the development coupling member 220B and the third clutch section CL3 is in the ON state, the driving force of the clutch gear 23 rotates the development driving shaft D2, and rotates the development coupling member 220B and a developing roller 204B. In contrast, when the third clutch section CL3 is in the OFF state, the development driving shaft D2 does not rotate, and the development coupling member 220B or the developing roller 204B does not rotate.

The switching between the ON state and the OFF state of the third clutch section CL3 is executed by moving a slide member 31 by the fourth clutch device B4. A second idler gear 24 that can mesh with the first idler gear 22, a third idler gear 25 that can mesh with the second idler gear 24, and the fourth clutch device B4 that can mesh with the third idler gear 25 are arranged downstream of drive of the first idler gear 22 of the drive transmission device DR. The third idler gear 25 being a driving rotational body has a gear portion 25a that meshes with the second idler gear 24, and a gear portion 25b that can mesh with the fourth clutch device B4. The third idler gear 25 constantly rotates while the motor MB rotates. The fourth clutch device B4 includes a second slip gear 30 that can mesh with a first slip gear 29 and is rotatable coaxially with the third idler gear 25. Further, the slide member 31 that makes a slide motion by rotation of the second slip gear 30, and a slide spring 32 that urges the slide member 31. The slide spring 32 has a fixed end 32a fixed to a fixing portion (not shown), and an operation end 32b arranged in a housing portion 31a of the slide member 31. The slide spring 32 urges the slide member 31 in a direction from the fixed end 32a to the operation end 32b. By rotation of the second slip gear 30 of the fourth clutch device B4, the slide member 31 makes the slide motion (reciprocating movement), and hence the third clutch section CL3 is alternately switched between the ON state and the OFF state. That is, the fourth clutch device B4 is a drive train for moving the slide member 31.

Configuration of Third Clutch Section CL3

Figure 23:
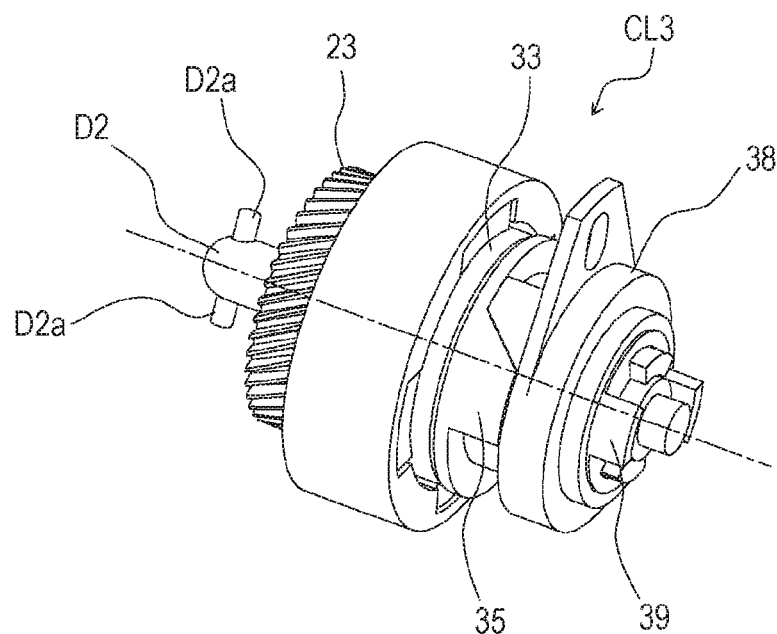
FIG. 23 is a perspective view showing a configuration of a third clutch section CL3.
Figure 24:
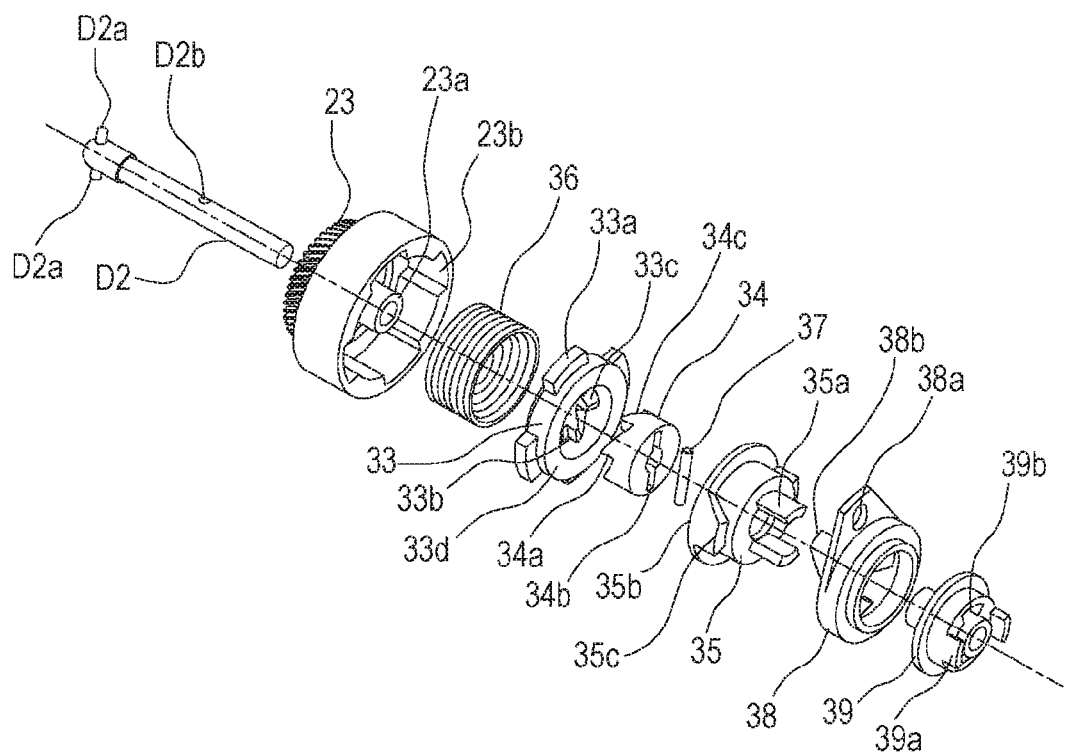
FIG. 24 is a perspective view of the third clutch section CL3 before assembly.

First, a configuration of the third clutch section CL3 is described with reference to FIGS. 23 and 24. FIG. 23 is a perspective view showing the configuration of the third clutch section CL3. FIG. 24 is a perspective view of the third clutch section CL3 before assembly. The development driving shaft D2 has a plurality of engagement portions D2a that engage with the development coupling member 220B. A parallel pin 37 is arranged in a hole D2b of the development driving shaft D2. The clutch gear 23 that meshes with the first idler gear 22 being a driving rotational body is rotatable relative to the development driving shaft D2, and the position of the clutch gear 23 is determined in the axial direction. The inside of the clutch gear 23 is hollowed. An inner peripheral portion of a slide boss 23a near the center serves as a slide surface for positioning in the axial direction and for rotation relative to the development driving shaft D2 at the driven side. An outer peripheral portion of the slide boss 23a serves as a slide surface for positioning in the axial direction and for rotation of a driving engagement member 33. Four rotation stoppers 23b are provided at the inside of the clutch gear 23. The rotation stoppers 23b serve as rotation stoppers for the driving engagement member 33.

An inner peripheral surface of the driving engagement member 33 is fitted on the outer peripheral portion of the slide boss 23a of the clutch gear 23. Accordingly, the driving engagement member 33 is supported so that the driving engagement member 33 can slide. Then, when rotation stoppers 33a provided on an outer peripheral portion mesh with the rotation stoppers 23b of the clutch gear 23, the driving engagement member 33 rotates together with the clutch gear 23. Also, four protrusions 33b are provided at the driving engagement member 33. The protrusions 33b mesh with protrusions 34a of a driven engagement member 34. Accordingly, the rotational force is transmitted to the driven engagement member 34. Surfaces of the protrusions 33b of the driving engagement member 33 meshing with the protrusions 34a are inclined in a direction in which the meshing surfaces bite into a counter part by rotation. Accordingly, even when the third clutch section CL3 is in the ON state, the meshing is reliably provided, and even when a large torque is applied, jumping does not occur. Also, portions between the protrusions 33b of the driving engagement member 33 are connected by gentle inclined surfaces 33c. Accordingly, even when the third clutch section CL3 is changed from the OFF state to the ON state during rotation, the engagement can be smoothly provided.

A slide portion 33d that rotationally slides on a release member 35 is provided at an end surface at the driven engagement member 34 side of the driving engagement member 33. Also, the driving engagement member 33 is constantly urged by a coil spring 36 serving as an elastic member toward the driven engagement member 34. The development driving shaft D2 is fitted into the inner peripheral surface of the driven engagement member 34, and the parallel pin 37 is fitted into a groove 34b of the driven engagement member 34. Also, the driven engagement member 34 has four protrusions 34a. When the protrusions 34a mesh with the protrusions 33b of the driving engagement member 33, the rotational force is transmitted. Surfaces of the protrusions 34a meshing with the protrusions 33b of the driving engagement member 33 are inclined in a biting direction similarly to the protrusions 33b of the counter part. Also, the protrusions 34a of the driven engagement member 34 are connected by gentle inclined surfaces 34c. The driving engagement member 33, the driven engagement member 34, and the coil spring 36 are provided inside the clutch gear 23. With this configuration, the space can be effectively used and the configuration can be compact. Also, the rotational force transmitted from the tooth surface can be directly transmitted. Accordingly, a force of twisting or tilting is not generated at the engagement member, the part strength is likely ensured, and a large torque can be transmitted.

The release member 35, a lever member 38, and a bearing 39 are provided coaxially with the development driving shaft D2. A rotation stopper portion 39a of the bearing 39 is fixed by a fixing member (not shown), and hence rotation is restricted. The release member 35 has a plurality of guide portions 35a. The guide portions 35a are fitted into a hole portion 39b of the bearing 39. Accordingly, the release member 35 is movable in the axial direction while its rotation is restricted relative to the development driving shaft D2. Also, the release member 35 has a contact portion 35b that contacts the slide portion 33d of the driving engagement member 33 and causes the release member 35 to move in the axial direction, and a pressed portion 35c that is pressed by the lever member 38.

The lever member 38 is provided rotatably relative to the bearing 39. The lever member 38 has a lever engagement portion 38a that engages with a slide engagement portion 31b provided at the slide member 31, and a pressing portion 38b that contacts the pressed portion 35c of the release member 35. The lever member 38 turns when the slide member 31 makes the slide motion. A plurality of the pressed portions 35c of the release member 35 are provided symmetrically to the axis center and a plurality of the pressing portions 38b of the lever member 38 are provided symmetrically to the axis center.

Description on Operation of Third Clutch Section CL3

Figure 25A:
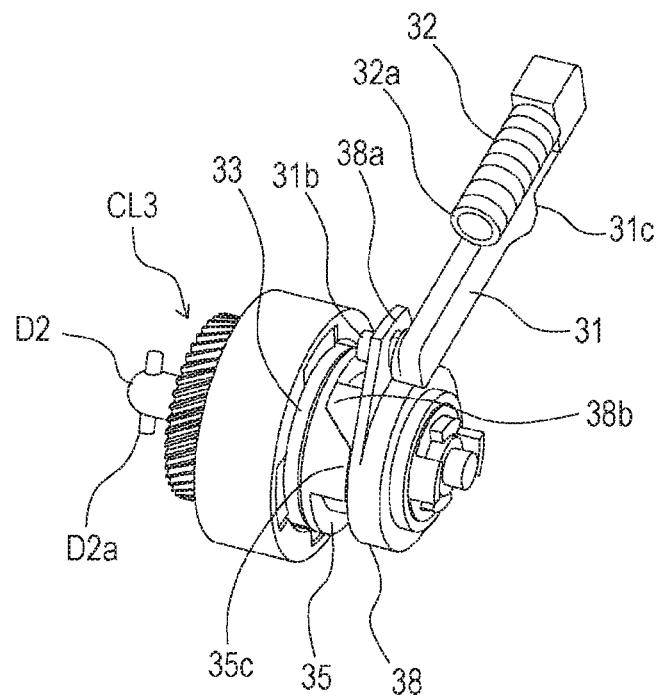
FIG. 25A is an explanatory view when the third clutch section CL3 is in an ON state.
Figure 25B:
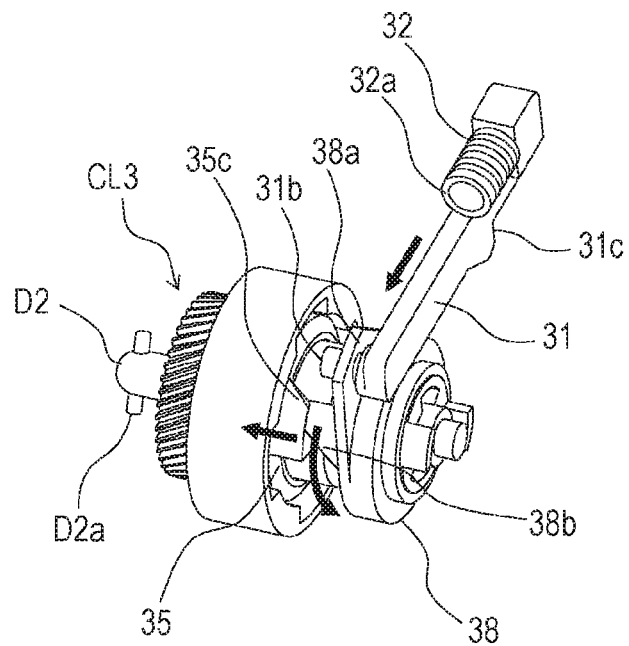
FIG. 25B is an explanatory view when the third clutch section CL3 is in an OFF state.

An operation of the third clutch section CL3 is described with reference to FIGS. 25A and 25B. FIG. 25A is an explanatory view of the ON state of the third clutch section CL3. FIG. 25B is an explanatory view of the OFF state. As shown in FIG. 25A, in a state in which the pressing portions 38b of the lever member 38 do not contact the pressed portions 35c of the release member 35, the release member 35 is pressed in a direction opposite to the clutch gear 23 by an elastic force of a coil spring 36. Accordingly, the driving engagement member 33 is pressed by the driven engagement member 34, and is brought into a meshing state (not shown). Accordingly, the rotational force from the motor MB is transmitted from the clutch gear 23 to the development driving shaft D2, that is, the state becomes the ON state.

In contrast, as shown in FIG. 25B, when the slide member 31 slides in a direction in which the slide member 31 compresses the slide spring 32, the lever member 38 turns counterclockwise. Accordingly, the pressing portions 38b of the lever member 38 contact the pressed portions 35c of the release member 35. The release member 35 is pushed and moved in the axial direction of the development driving shaft D2. Accordingly, the contact portion 35b of the release member 35 contacts the slide portion 33d of the driving engagement member 33, and the driving engagement member 33 is separated from the driven engagement member 34 against the urging force of the coil spring 36. Accordingly, the rotational force from the motor MB is not transmitted from the clutch gear 23 to the development driving shaft D2, that is, the state becomes the OFF state.

In this case, a load resistance when the lever member 38 is turned is the largest in the OFF state in which the coil spring 36 is the most compressed, by the influence of the elastic force of the coil spring 36. In contrast, in the ON state, since the elastic force of the coil spring 36 is used for pressing the driving engagement member 33 to the driven engagement member 34, the load resistance when the lever member 38 is turned is as small as a rotational sliding load between the lever member 38 and the bearing 39. Accordingly, the urging force of the slide spring 32 for restoring the slide member 31 to the position in the ON state is a larger urging force than the load resistance when the lever member 38 in the OFF state is moved.

Configuration of Fourth Clutch Device B4

Figure 26A:
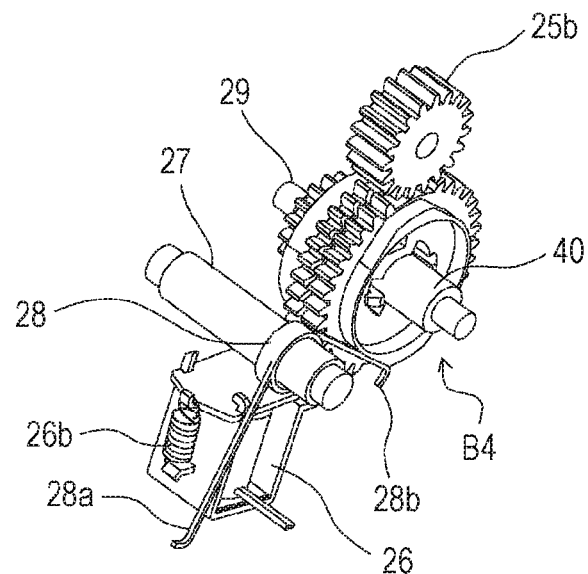
FIG. 26A is an explanatory view of a fourth clutch device B4 when viewed from the front side of the drive transmission device DR.
Figure 26B:
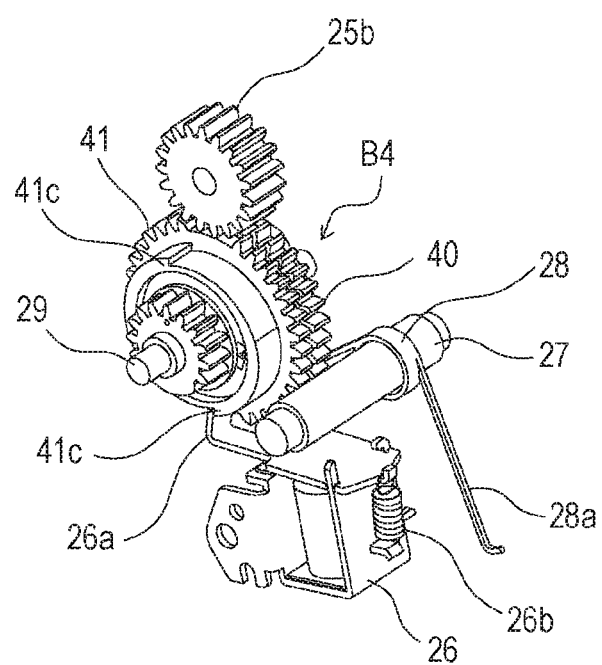
FIG. 26B is an explanatory view of the fourth clutch device B4 when viewed from the back side of the drive transmission device DR.
Figure 27A:
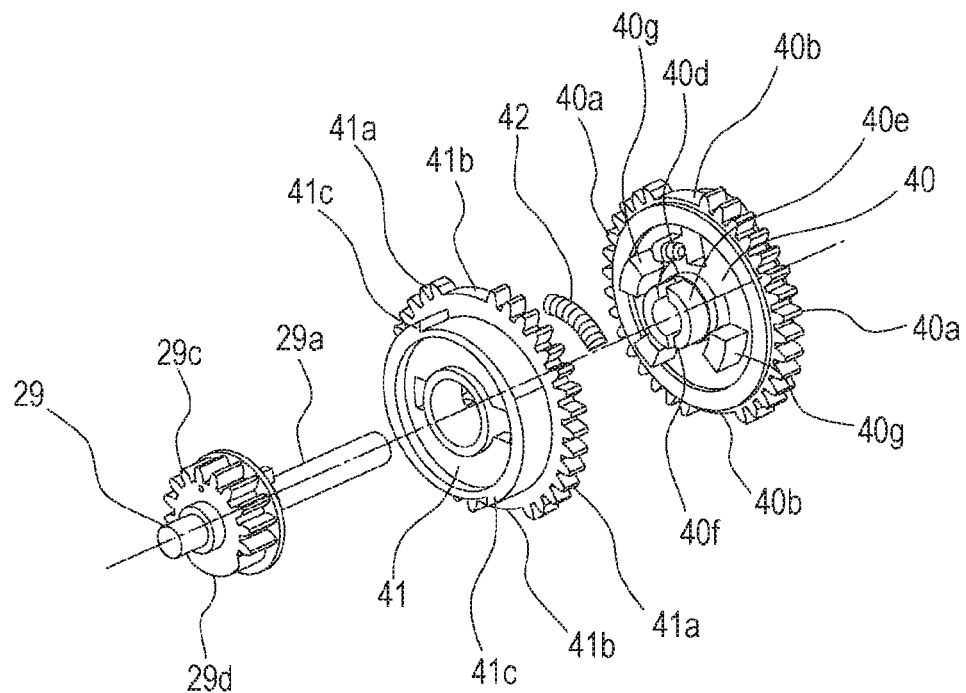
FIG. 27A explains assembly of the fourth clutch device B4 when viewed from a trigger gear side.
Figure 27B:
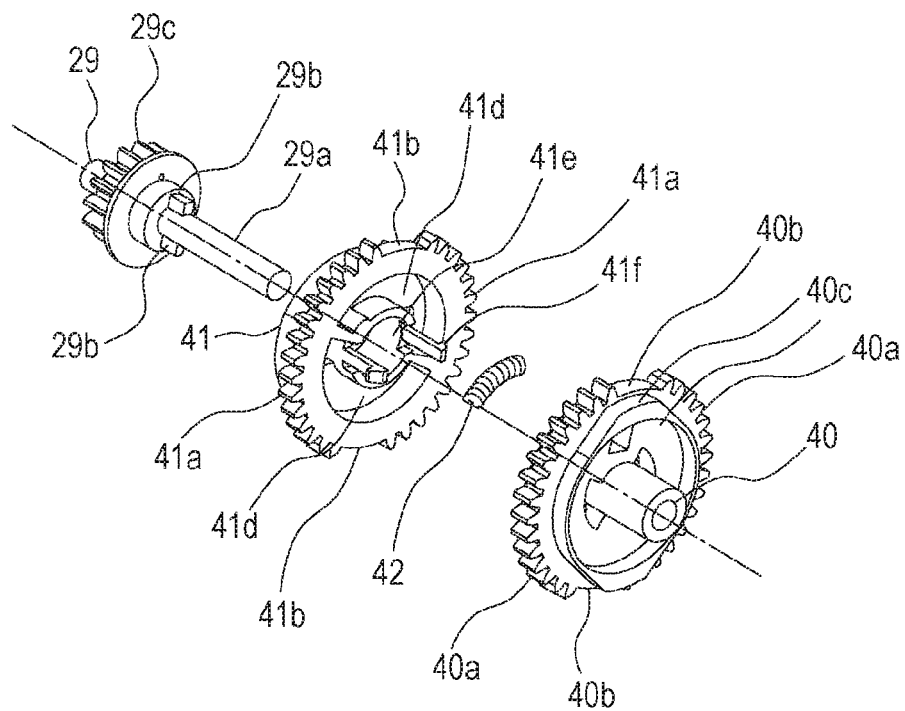
FIG. 27B explains assembly of the fourth clutch device B4 when viewed from a driven gear side.

Next, a configuration of the fourth clutch device B4 is described with reference to FIG. 26A, FIG. 26B, FIG. 27A, FIG. 27B, FIG. 28A, FIG. 28B, FIG. 29A, and FIG. 29B. FIG. 26A is an explanatory view of the fourth clutch device B4 when viewed from the front side of the drive transmission device DR, and FIG. 26B is an explanatory view of the fourth clutch device B4 when viewed from the back side of the drive transmission device DR. FIG. 27A and FIG. 27B are perspective views explaining assembly of the fourth clutch device B4. Each of FIGS. 26A, 27A, 28A, and 29A is an illustration viewed from the trigger gear side. Each of FIGS. 26B, 27B, 28B, and 29B is an illustration viewed from the driven gear side.

The fourth clutch device B4 includes a driven gear 40 and a trigger gear 41 that can mesh with the gear portion 25b of the third idler gear (a driving rotational body) 25. The fourth clutch device B4 is arranged on the axis of a rotating shaft 29a of the first slip gear 29.

A solenoid 26 that controls the operation of the fourth clutch device B4, a spring support shaft 27, and a torsion spring 28 (an elastic member) are arranged near the fourth clutch device B4. The driven gear (a driven rotational body) 40 includes, in an integrated manner, two driven gear portions 40a, two driven toothless portions 40b, a cam portion 40c, a boss 40d, a slide shaft portion 40e, an engagement portion 40f, and key portions 40g. The two driven gear portions 40a can mesh with the gear portion 25b of the third idler gear 25. The two driven toothless portions 40b are portions that do not mesh with the gear portion 25b provided at part of the driven gear portions 40a. The torsion spring 28 contacts the cam portion 40c, and the cam portion 40c causes an urging force to be applied to the driven gear 40 and causes the driven gear 40 to be rotated. The boss 40d is provided with a trigger spring 42. The engagement portion 40f engages with the first slip gear. Also, the driven gear portions 40a are symmetrically provided about the center of the rotating shaft of the driven gear 40, and the driven toothless portions 40b are symmetrically provided about the center of the rotation shaft of the driven gear 40. The gear of the driven gear portions 40a has a tooth-number diameter corresponding to 36 teeth. Tooth portions forming the driven gear portions 40a each have 15 teeth. The driven toothless portions 40b each have a size corresponding to 3 teeth of each of the driven gear portions 40a.

The trigger gear (another driven rotational body) 41 includes, in an integrated manner, two trigger gear portions 41a, two trigger toothless portions 41b, two retained portions 41c, housing portions 41d, a slide surface 41e, and claws 41f. The two trigger gear portions 41a can mesh with the gear portion 25b of the third idler gear 25. The two trigger toothless portions 41b are portions that do not mesh with the gear portion 25b provided at part of the trigger gear portions 41a. The two retained portions 41c are retained by a retaining claw 26a of the solenoid 26. The housing portions 41d house the trigger spring 42. The slide surface 41e is rotationally supported by the slide shaft portion 40e of the driven gear 40. The claws 41f position the driven gear 40 in the axial direction. Also, the trigger gear portions 41a are symmetrically provided about the center of the rotating shaft of the trigger gear 41. The trigger toothless portions 41b are symmetrically provided about the center of the rotating shaft of the trigger gear 41. The retained portions 41c are symmetrically provided about the center of the rotating shaft of the trigger gear 41. The gear of the trigger gear portions 41a has a tooth-number diameter corresponding to 36 teeth. Tooth portions forming the trigger gear portions 41a each have 15 teeth. The trigger toothless portions 41b each have a size corresponding to 3 teeth of each of the trigger gear portions 41a. When the trigger gear 41 is arranged at the driven gear 40 by the claws 41f, the key portions 40g of the driven gear 40 are housed in the housing portions 41d of the trigger gear 41. In a state in which the key portions 40g are housed in the housing portions 41d, plays are provided between the key portions 40g and the housing portions 41d. The trigger gear 41 can rotate relative to the driven gear 40 around the center of the rotating shaft by the amounts of the plays.

The solenoid 26 includes the retaining claw 26a and a return spring 26b. When the return spring 26b urges the retaining claw 26a toward the trigger gear 41, the solenoid 26 is not energized, and one of the retained portions 41c is located at the position at which the retained portion 41c faces the retaining claw 26a, the retaining claw 26a can restrict the rotation of the trigger gear 41 by retaining the retained portion 41c. When the solenoid 26 is energized, the retaining claw 26a is retracted from the trigger gear 41 against the urging force of the return spring 26b. If the retained portion 41c is retained by the retaining claw 26a until then, the retention on the retained portion 41c of the trigger gear 41 by the retaining claw 26a can be released.

A first end of the trigger spring 42 is fixed to the boss 40d of the driven gear 40, and a second end of the trigger spring 42 is housed in one of the housing portions 41d of the trigger gear 41. The trigger spring 42 urges the trigger gear in a direction in which the trigger gear is separated from the driven gear 40 in the rotation direction. Also, when the solenoid 26 is energized and the retaining claw 26a releases the retention on the retained portion 41c of the trigger gear 41, the trigger spring 42 applies a rotation starting force to the trigger gear 41, and one of the trigger gear portions 41a meshes with the gear portion 25b.

The torsion spring 28 includes a fixed arm 28a fixed at a fixing portion (not shown) and a movable arm 28b that contacts the cam portion of the driven gear, and the torsion spring 28 is held by the spring support shaft 27. When the driven gear 40 is in a predetermined rotation phase, by pressing the cam portion 40c of the driven gear 40 by the elastic force of the torsion spring 28, the driven gear 40 is urged to rotate. Even when one of the driven toothless portions 40b of the driven gear 40 faces the gear portion 25b of the third idler gear 25 and the driven gear 40 cannot obtain a sufficient driving force from the third idler gear 25, the driven gear 40 can be rotated by the pressure of the torsion spring 28.

The first slip gear (a first rotational body) 29 includes engagement portions 29b and a first slip portion 29d. The engagement portions 29b engage with the engagement portion 40f of the driven gear 40. The first slip portion 29d does not have a first gear portion 29c (a first rotational body) or a gear portion. The first slip portion 29d has a pitch-circle diameter of a protruding shape being an arcuate surface with the same radius as the radius of the pitch circle of the first gear portion 29c. The first slip gear 29 is coupled coaxially by the engagement portions 29b and the engagement portion 40f of the driven gear 40. When the driven gear 40 meshes with the third idler gear 25 and rotates, the first slip gear 29 rotates together. Also, the gear of the first slip gear 29 has a tooth-number diameter corresponding to 16 teeth. A tooth portion forming the first gear portion 29c has 11 teeth. The first slip portion 29d has a size corresponding to 5 teeth of the first gear portion 29c.

Figure 28A:
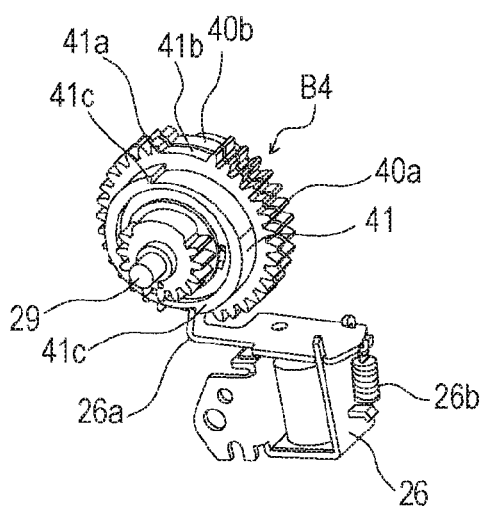
FIG. 28A is a state diagram in which a retained portion 41c of a trigger gear 41 is retained.
Figure 28B:
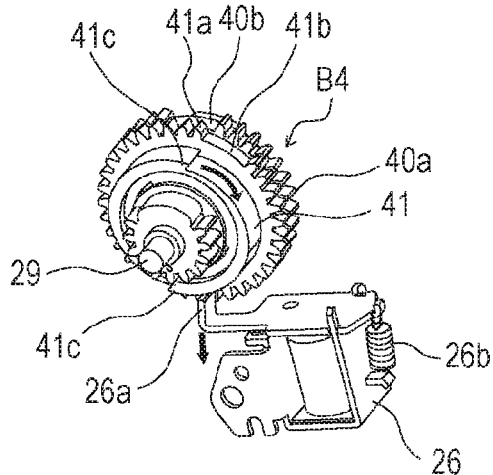
FIG. 28B is a state diagram in which the retention on the retained portion 41c of the trigger gear 41 is released.

Next, arrangement of the trigger gear 41 and the driven gear 40 is described with reference to FIGS. 28A and 28B. FIG. 28A is a state diagram in which one of the retained portions 41c of the trigger gear 41 is retained, and FIG. 28B is a state diagram in which the retention on the retained portion 41c of the trigger gear 41 is released. As shown in FIG. 28A, in a state in which the retaining claw 26a retains the retained portion 41c of the trigger gear 41, the rotation of the trigger gear 41 is restricted, and the trigger gear portions 41a and the trigger toothless portions 41b are respectively arranged in the same phases as the phases of the driven gear portions 40a and the driven toothless portions 40b. As shown in FIG. 28B, when the solenoid 26 is energized and the retaining claw 26a releases the retention on the retained portion 41c, the trigger gear 41 rotates clockwise by a rotation starting force of the trigger spring 42 (not shown). In this embodiment, as the above-described amounts of the plays between the key portions 40g and the housing portion 41d, the gears of the trigger gear portions 41a are rotated relative to the gears of the driven gear portions 40a by the amount of 3 teeth.

Figure 29A:
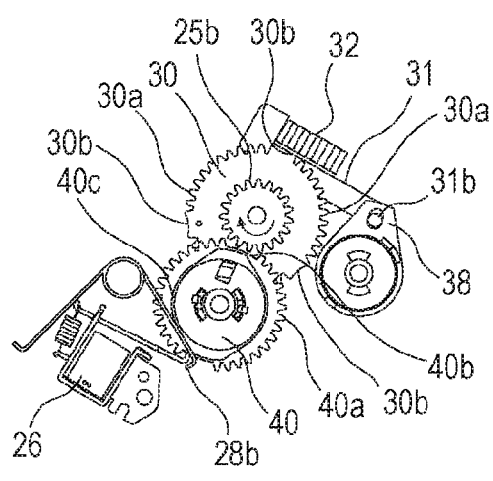
FIG. 29A is an illustration around the fourth clutch device B4 when viewed from the front side.
Figure 29B:
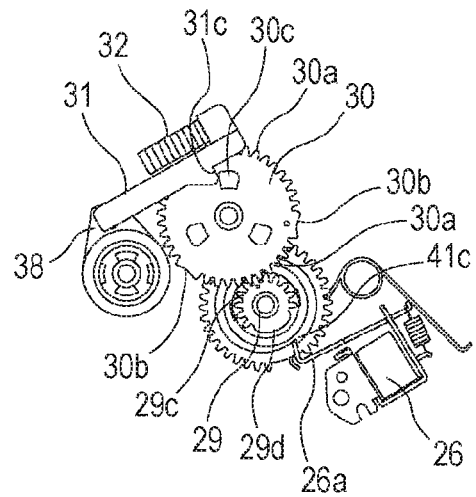
FIG. 29B is an illustration around the fourth clutch device B4 when viewed from the back side.

The second slip gear 30 and the slide member 31 are described with reference to FIGS. 29A and 29B. FIG. 29A is an illustration around the fourth clutch device B4 when viewed from the front side, and FIG. 29B is an explanatory view around the fourth clutch device B4 when viewed from the back side. A component not required for description is not illustrated for easier description on the configuration. The second slip gear (a second rotational body) 30 has three second gear portions 30a (second rotational bodies) that can mesh with the first gear portion 29c of the first slip gear 29, and three second slip portions 30b that do not have a gear portion and hence do not mesh with the first gear portion 29c. The second slip portions 30b each have an arcuate surface in a recessed shape being coaxial with the rotation center of the first slip gear 29 when one of the second slip portions 30b is located at a position at which the second slip portion 30b faces one of the first slip portions 29d. The arcuate surface has the same radius as the pitch-circle radius of the first gear portion 29c.

The second gear portions 30a are provided in equal phases about the rotation center of the second slip gear 30. The second slip portions 30b are provided in equal phases about the rotation center of the second slip gear 30. The gear of the second slip gear 30 has a tooth-number diameter corresponding to 39 teeth. Tooth portions forming the second gear portions 30a each have 10 teeth. The second slip portions 30b each have a size corresponding to 3 teeth of the second gear portions 30a. As described above, the number of teeth (10 teeth) of each second gear portion 30a is smaller than the number of teeth (11 teeth) of the first gear portion 29c by one tooth. The first slip gear 29 and the second slip gear 30 are assembled by aligning their relative rotation phases so that the first slip portion 29d having the arcuate surface in the protruding shape extends along each of the second slip portions 30b having the arcuate surfaces in the recessed shapes.

The first slip gear 29 and the second slip gear 30 are formed of a material with a small frictional coefficient to allow the first slip portion 29d to slide on each second slip portion 30b. Also, to improve the sliding property, a lubricant such as grease may be applied between the first slip portion 29d and the second slip portions 30b if required. Also, the second slip gear 30 has three bosses 30c in equal phases about the rotation center. The slide member 31 makes a slide motion by rotation of the second slip gear 30. The slide member (a driven member) 31 has the engagement portion 31b that engages with the lever member 38 of the third clutch section CL3, and a contact portion 31c that contacts the second slip gear 30. The slide member 31 is a movable member that is guided by a guide member (not shown) and is arranged so as to slide back and forth in the longitudinal direction of the slide member 31. Also, the slide member 31 is urged by the slide spring 32 in a direction in which the contact portion 31c contacts one of the bosses 30c of the second slip gear 30. When the contact portion 31c does not contact the boss 30c, the third clutch section CL3 is changed to the ON state from the OFF state by the urging force.

Description on Operation of Drive Transmission Device

Figure 30A:
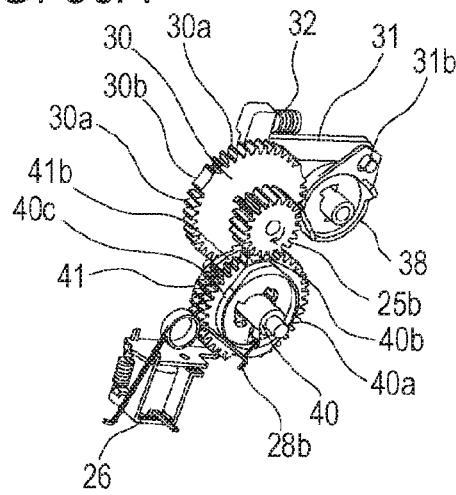
FIG. 30A is a perspective view around the fourth clutch device B4 when viewed from the front side.
Figure 30B:
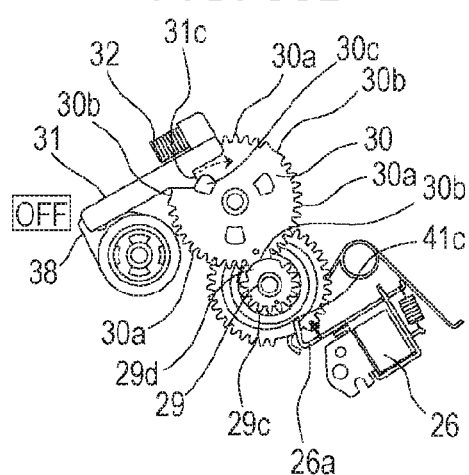
FIG. 30B is an explanatory view around the fourth clutch device B4 when viewed from the back side.
Figure 31A:
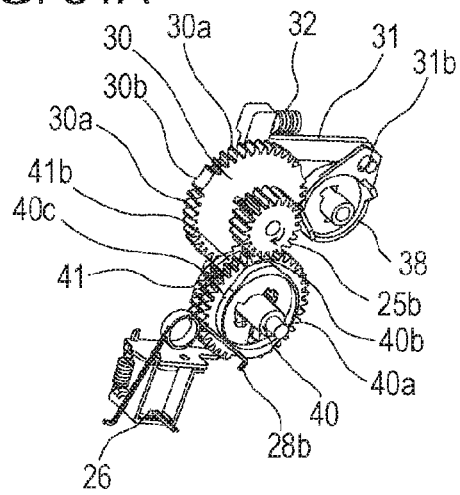
FIG. 31A is a perspective view around the fourth clutch device B4 when viewed from the front side.
Figure 31B:
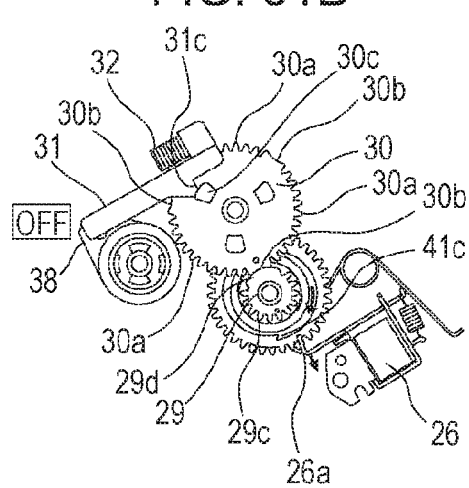
FIG. 31B is an explanatory view around the fourth clutch device B4 when viewed from the back side.
Figure 32A:
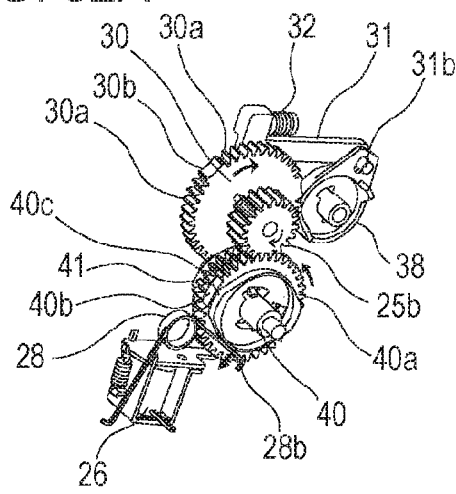
FIG. 32A is a perspective view around the fourth clutch device B4 when viewed from the front side.
Figure 32B:
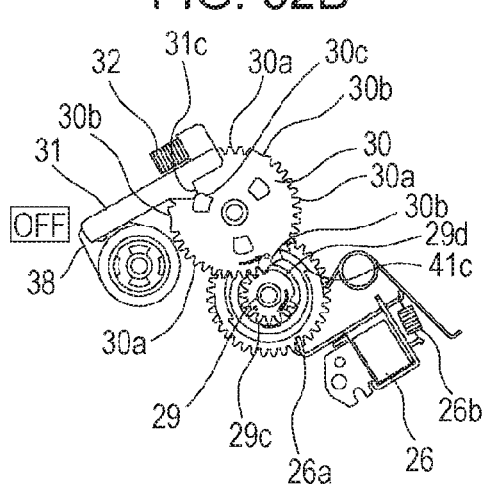
FIG. 32B is an explanatory view around the fourth clutch device B4 when viewed from the back side.
Figure 33A:
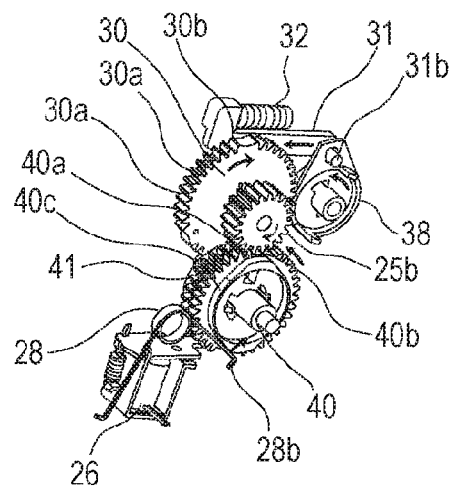
FIG. 33A is a perspective view around the fourth clutch device B4 when viewed from the front side.
Figure 33B:
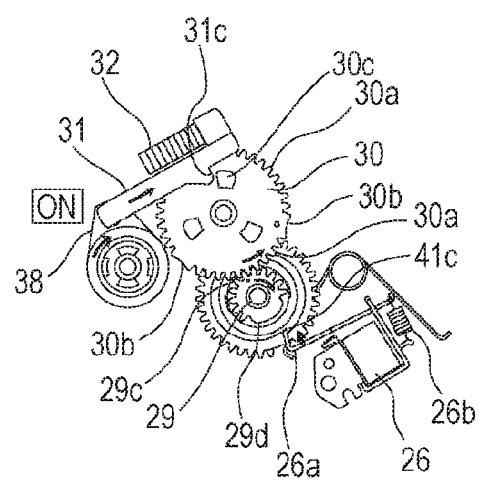
FIG. 33B is an explanatory view around the fourth clutch device B4 when viewed from the back side.
Figure 34A:
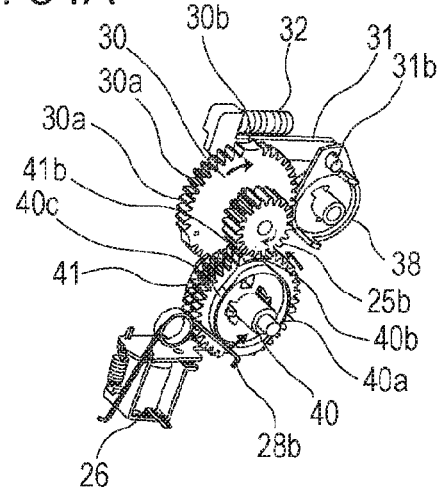
FIG. 34A is a perspective view around the fourth clutch device B4 when viewed from the front side.
Figure 34B:
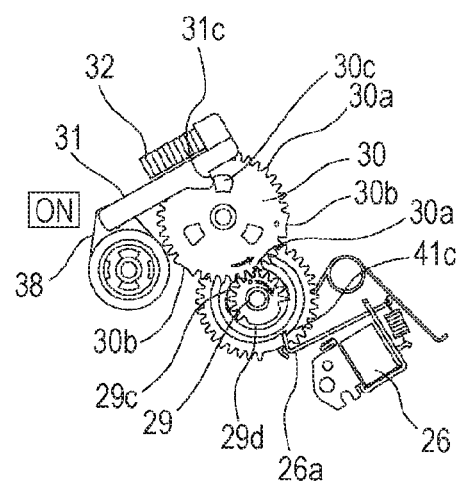
FIG. 34B is an explanatory view around the fourth clutch device B4 when viewed from the back side.
Figure 35A:
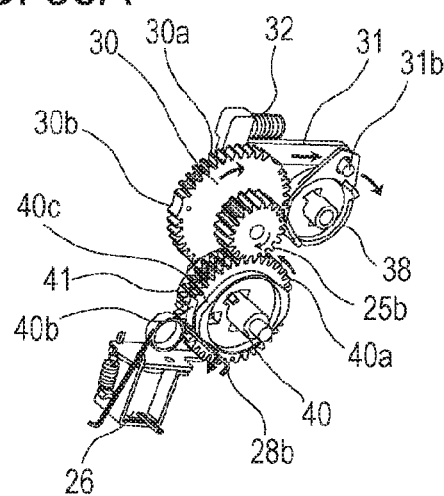
FIG. 35A is a perspective view around the fourth clutch device B4 when viewed from the front side.
Figure 35B:
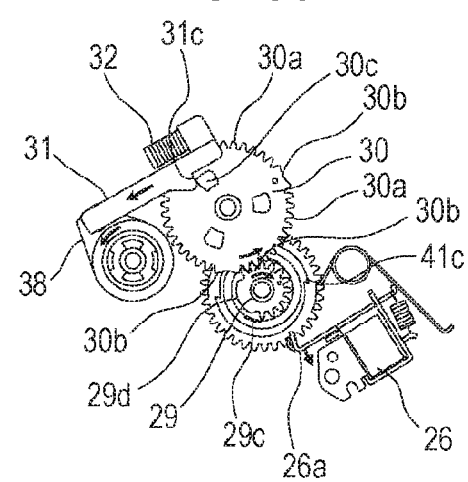
FIG. 35B is an explanatory view around the fourth clutch device B4 when viewed from the back side.
Figure 36A:
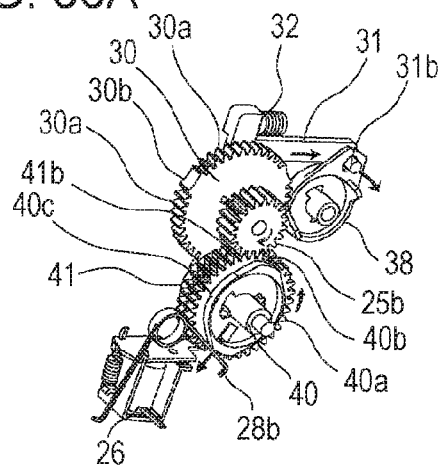
FIG. 36A is a perspective view around the fourth clutch device B4 when viewed from the front side.
Figure 36B:
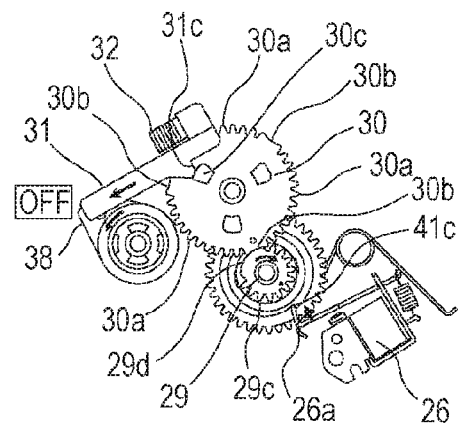
FIG. 36B is an explanatory view around the fourth clutch device B4 when viewed from the back side.
Figure 37A:
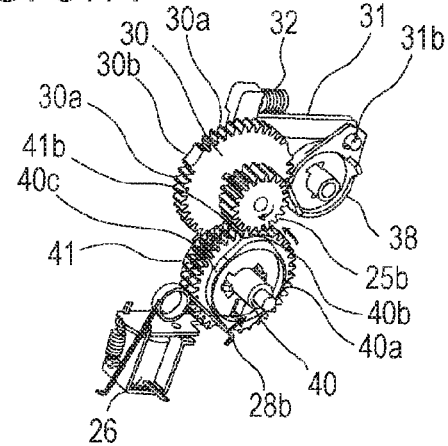
FIG. 37A is a perspective view around the fourth clutch device B4 when viewed from the front side.
Figure 37B:
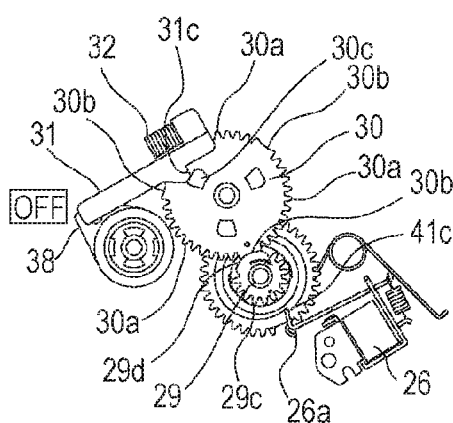
FIG. 37B is an explanatory view around the fourth clutch device B4 when viewed from the back side.

Next, an operation of the drive transmission device DR is described with reference to FIGS. 30A to 37B. Each of FIGS. 30A, 31A, 32A, 33A, 34A, 35A, 36A, and 37A is a perspective view around the fourth clutch device B4 when viewed from the front side, and each of FIGS. 30B, 31B, 32B, 33B, 34B, 35B, 36B, and 37B is an explanatory illustration around the fourth clutch device B4 when viewed from the back side. FIGS. 30A and 30B show a first standby state of the fourth clutch device B4. FIGS. 31A and 31B shows rotation start of the trigger gear of the fourth clutch device B4. FIGS. 32A and 32B shows a drive transmission state of the fourth clutch device B4. FIGS. 33A and 33B shows state immediately before drive transmission end of the fourth clutch device B4. FIGS. 34A and 34B shows a second standby state of the fourth clutch device B4. FIGS. 35A and 35B shows the drive transmission state shifted from the second standby state of the fourth clutch device B4. FIGS. 36A and 36B shows the drive transmission end state shifted from the second standby state and then from the drive transmission state of the fourth clutch device B4. FIGS. 37A and 37B shows a state immediately before the driven gear reaches a home position, from the drive transmission shifted from the second standby state of the fourth clutch device B4. Also, the rotation directions of respective components in FIGS. 30A to 37B are as indicated by arcuate arrows illustrated next to the respective components.

In the first standby state of the fourth clutch device B4, as shown in FIG. 30A, the movable arm 28b contacts a flat portion of the cam portion 40c, and urges the flat portion toward the center of the rotating shaft of the driven gear 40. In this state, the pressing force of the movable arm 28b does not act as a rotational moment of the driven gear 40 and hence the driven gear 40 is at the home position. Also, the driven toothless portion 40b faces the gear portion 25b.

Accordingly, the driving force is not transmitted from the gear portion 25b to the driven gear 40. Also, in the first standby state of the fourth clutch device B4, as shown in FIG. 28A described above, the trigger gear 41 is urged by the trigger spring 42 to rotate clockwise; however, the retaining claw 26a retains the retained portion 41c and hence the trigger gear 41 is at a stop. At this time, the trigger toothless portion 41b is also at the home position at which the trigger toothless portion 41b faces the gear portion 25b. The driving force of the gear portion 25b is not transmitted to the trigger gear 41.

The slide member 31 slides by the boss 30c in a direction in which the slide spring 32 is compressed, and the position of the slide member 31 is fixed at a first position. With this state of the slide member 31, the lever member 38 is turned to a position at which the third clutch section CL3 becomes the OFF state. Also, as shown in FIG. 30B, the first slip portion 29d contacts the second slip portion 30b. In this state, since the rotation of the second slip gear 30 is restricted, even when the second slip gear 30 receives the rotational torque from the slide member 31 due to the urging force of the slide spring 32, the second slip gear 30 cannot be rotated. This state is a state in which the second slip gear 30 is at the home position. The home position (a stop phase) of the second slip gear 30 when the third clutch section CL3 is in the OFF state and the first slip portion 29d contacts the second slip portion 30b is hereinafter called OFF home position (a first stop phase) of the second slip gear 30.

Then, to execute drive transmission by the fourth clutch device B4, the trigger gear 41 is rotated first. To rotate the trigger gear 41, as shown in FIG. 31B, the solenoid 26 is energized, hence the retaining claw 26a is retracted from the retained portion 41c, and the retention on the retained portion 41c by the retaining claw 26a is released. Then, as shown in FIG. 28B described above, the trigger gear 41 starts to rotate clockwise by the elastic force of the trigger spring 42. At this time, the cam portion 40c of the driven gear 40 is pressed by the movable arm 28b. The rotation of the driven gear 40 is restricted and hence the driven gear 40 does not rotate.

When the trigger gear 41 rotates by a predetermined amount, as shown in FIG. 31B, the trigger gear portion 41a meshes with the gear portion 25b, the trigger gear 41 receives the driving force from the gear portion 25b, and hence the trigger gear 41 rotates. The driven gear 40 is held at the home position by the pressing force of the movable arm 28b until the trigger gear portion 41a of the trigger gear 41 rotates by the amount of 3 teeth relative to the gear of the driven gear portion 40a as shown in FIG. 28B. Accordingly, the first slip gear 29 or the second slip gear 30 is not rotated while the driven gear 40 is at a stop.

In the drive transmission state of the fourth clutch device B4, as shown in FIG. 32A, when the trigger gear portion 41a rotates by the amount of 3 teeth relative to the gear of the driven gear portion 40a, the driven gear 40 starts to rotate. Then, the driven gear portion 40a meshes with the gear portion 25b, and the driving force is transmitted from the gear portion 25b to the driven gear 40. Also, when the driven gear 40 starts to rotate, the first slip portion 29d rotates relative to the second slip portion 30b in a sliding manner while the first slip gear 29 does not rotate the second slip gear 30.

When the first slip gear 29 rotates by a predetermined amount, as shown in FIG. 32B, a tooth of the first gear portion 29c arranged next to a downstream-side end portion of the first slip portion 29d in the rotation direction of the first slip gear 29 engages with an end portion of the second slip portion 30b and starts the rotation of the second slip gear 30. Accordingly, the first gear portion 29c meshes with the second gear portion 30a, and the second slip gear 30 rotates counterclockwise. At this time, in the second slip gear 30, the boss 30c and the contact portion 31c are rotated in a sliding manner, and the slide member 31 does not slide.

After the retention on the retained portion 41c is released and the driven gear 40 rotates, application of electricity to the solenoid 26 is stopped. Accordingly, the retaining claw 26a moves toward the trigger gear 41 by the return spring 26b, and the retaining claw 26a is brought into the standby state in which the retaining claw 26a can retain the retained portion 41c. Also, while the driven gear 40 meshes with the gear portion 25b and rotates, the cam portion 40c presses the movable arm 28b against the elastic force of the torsion spring 28, compresses the torsion spring 28, and charges the elastic force.

Immediately before the end of drive transmission of the fourth clutch device B4, as shown in FIG. 33B, the retained portion 41c of the trigger gear 41 is retained by the retaining claw 26a, and the rotation is stopped at the home position. Also, with the rotation of the second slip gear 30, the boss 30c is separated from the contact portion 31c, the slide member 31 slides by the urging force of the slide spring 32 in a direction in which the slide spring 32 is expanded. Then, the slide member 31 is stopped at a stop portion (not shown). Accordingly, the lever member 38 is moved to a position at which the third clutch section CL3 becomes the ON state.

As shown in FIG. 33B, only one tooth of the driven gear portion 40a meshes with the gear portion 25b. The state is immediately before the end of meshing with the gear portion 25b. When the driven gear portion 40a is further rotated, the driven toothless portion 40b faces the gear portion 25b, the driven gear portion 40a cannot mesh with the gear portion 25b, and the driven gear 40 no longer receives the driving force from the gear portion 25b. At this time, if the driven toothless portion 40b stops before moving to the position at which the driven toothless portion 40b completely faces the gear portion 25b, sound may be generated by slight collision between the rotating gear portion 25b and a tooth tip of the driven gear portion 40a. To avoid this, the driven gear 40 is further rotated without the driving force from the gear portion 25b. To be specific, the driven gear 40 is rotated by pressing the cam portion 40c by the elastic force of the torsion spring 28 and hence, so that the driven toothless portion 40b completely faces the gear portion 25b and the teeth of the driven gear portion 40a are sufficiently retracted from the gear portion 25b in the rotation direction of the gear portion 25b. The driven gear 40 is rotated to a position, at which the driven gear 40 is no longer rotated by the pressure on the cam portion 40c with the movable arm 28b due to the elastic force of the torsion spring 28. Accordingly, the fourth clutch device B4 becomes the second standby state.

In the second standby state of the fourth clutch device B4, as shown in FIG. 34A, the first slip gear 29, the driven gear 40, and the trigger gear 41 are rotated from the state in FIG. 30A by 180 degrees, and the trigger gear 41 is at the home position. Accordingly, the driven gear 40 is also at the home position, at which the driven toothless portion 40b faces the gear portion 25b. The driving force is not transmitted from the gear portion 25b to the trigger gear 41 or the driven gear 40.

Next, as shown in FIG. 34B, the boss 30c is immediately before the boss 30c contacts the contact portion 31c of the slide member 31. Similarly to the state in FIG. 33B, the slide member 31 is stopped at a stop portion (not shown) by the urging force of the slide spring 32 and the lever member 38 is positioned at a second position, at which the third clutch section CL3 becomes the ON state. Also, the first gear portion 29c meshes with the second gear portion 30a of the second slip gear 30. The phase of the second slip gear 30 in which the third clutch section CL3 is in the ON state, the trigger gear 41 and the driven gear 40 are at the home positions, and the first gear portion 29c meshes with the second gear portion 30a is called ON home position (a second stop phase) of the second slip gear 30.

In the drive transmission state shifted from the second standby state of the fourth clutch device B4, as shown in FIG. 35A, the solenoid 26 is energized, hence the retaining claw 26a is retracted from the retained portion 41c, and the retention on the retained portion 41c by the retaining claw 26a is released. Then, similarly to FIG. 31A, the trigger gear 41 rotates first, and then the driven gear 40 starts to rotate. By the rotation of the driven gear 40, the first slip gear 29 rotates together with the driven gear 40, and the second slip gear 30 rotates. Also, while the driven gear 40 meshes with the gear portion 25b and rotates, the cam portion 40c presses the movable arm 28b against the elastic force of the torsion spring 28, compresses the torsion spring 28, and charges the elastic force.

Also, by the rotation of the second slip gear 30, the boss 30c contacts the contact portion 31c of the slide member 31, and causes the slide member 31 to make a slide motion in a direction in which the slide spring 32 is compressed against the urging force of the slide spring 32. Accordingly, the slide member 31 turns the lever member 38 to a position, at which the third clutch section CL3 is changed from the ON state to the OFF state.

In the drive transmission end state from the drive transmission shifted from the second standby state of the fourth clutch device B4, as shown in FIG. 36A, the driven gear portion 40a meshes with the gear portion 25b, and the driven gear 40 receives the driving force from the gear portion 25b and rotates. Also, as shown in FIG. 36B, the retaining claw 26a retains the retained portion 41c and the rotation of the trigger gear 41 is stopped. The trigger gear 41 is at the home position and is at a stop.

The second slip gear 30 rotates until the meshing between the first gear portion 29c and the second gear portion 30a is ended and the first slip portion 29d faces the second slip portion 30b. Accordingly, the second slip gear 30 does not receive the driving force transmitted from the first slip gear 29, which rotates together with the driven gear 40, and the second slip gear 30 is arranged at the OFF home position again. Also, the lever member 38 is moved to the position, at which the third clutch section CL3 becomes the OFF state by the boss 30c and the slide member 31 is fixed.

In a state immediately before the drive transmission from the drive transmission shifted from the second standby state of the fourth clutch device B4 is ended and the driven gear 40 reaches the home position, as shown in FIG. 37A, the driven gear portion 40a meshes with only one tooth of the gear portion 25b. This state is a state immediately before the meshing with the gear portion 25b is ended. When the driven gear 40 is further rotated from this state, similarly to FIG. 33B, the driven toothless portion 40b faces the gear portion 25b, the driven gear portion 40a cannot mesh with the gear portion 25b, and the driven gear 40 no longer receives the driving force from the gear portion 25b. Hence, the driven gear 40 rotates to the home position by causing the movable arm 28b to press the cam portion 40c by the elastic force of the torsion spring 28.

Also, as shown in FIG. 37B, while the driven gear 40 is rotated to the home position only by the elastic force of the torsion spring 28, the first slip portion 29d slides on the second slip portion 30b. The first slip gear 29 rotates without rotating the second slip gear 30, moves to the home position, and stops. Accordingly, the fourth clutch device B4 becomes the first standby state shown in FIGS. 30A and 30B again. That is, the first slip portion 29d faces the second slip portion 30b before a timing, at which the driven gear portion 40a no longer meshes with the gear portion 25b. Accordingly, the first slip portion 29d slides on the second slip portion 30b before the timing, at which the driven gear portion 40a no longer meshes with the gear portion 25b, and the driving force of the first slip gear 29 is no longer transmitted to the second slip gear 30.

As described above, in this embodiment, when the second slip gear 30 is moved to the OFF home position, the slide member 31 is moved to the first position against the urging force of the slide spring 32. In contrast, when the second slip gear 30 is moved to the ON home position, the urging force of the slide spring 32 does not act as a drag when the slide member 31 is moved to the second position. That is, a load required for moving the slide member 31 is larger when the slide member 31 is moved to the first position than a load required when the slide member 31 is moved to the second position. Hence, a rotational resistance of the second slip gear 30 is the largest when the second slip gear 30 is moved to the OFF home position. Also, in the fourth clutch device B4, the driven gear 40 cannot obtain the driving force from the gear portion 25b and the driven gear 40 is rotated only by the elastic force of the torsion spring 28. However, at this time, the first slip portion 29d faces the second slip portion 30b, and the first slip gear 29 is rotatable without rotating the second slip gear 30. Also, when the second slip gear 30 is arranged at the OFF home position, the rotation of the second slip gear 30 is restricted even when the second slip gear 30 receives an external force or the like other than the rotational torque from the slide member 31 due to the urging force of the slide spring 32.

Hence, the elastic force of the torsion spring 28 that rotates the driven gear 40 can be set as follows. That is, the elastic force of the torsion spring 28 can be merely a force that is larger than the total sum of a force of rotating the driven gear 40 by a predetermined amount against the elastic force of the trigger spring 14 when the driven gear 40 cannot obtain the driving force from the gear portion 25b, and a rotational resistance force of the first slip gear 29, such as a frictional force.

Therefore, the elastic force of the torsion spring 28 being the elastic member can be decreased, and collision sound which is generated because the elastic member collides with the driven rotational body when the elastic member presses the driven rotational body can be decreased. Also, the ease of assembly and workability are less degraded. Also, the torsion spring 28 being the elastic member constantly contacts and slides on the cam portion 40c of the driven gear 40 being the driven rotational body. Hence, by decreasing the elastic force of the torsion spring 28 being the elastic member, the sliding load can be decreased, the driving force required for the drive source (the motor MB) can be decreased, and the low-output, inexpensive, and compact drive source can be used.

Also, the rotational resistance received by the second slip gear 30 is the largest when the second slip gear 30 moves to the OFF home position by receiving the urging force of the slide spring 32 through the slide member 31 and the load resistance when the lever member 38 is turned. Hence, the second slip portion 30b of the second slip gear 30 is formed so that the first slip portion 29d rotates while sliding on the second slip portion 30b when the second slip gear 30 moves to the OFF home position. Accordingly, as described above, the elastic force of the torsion spring 28 can be set at a small force.

In contrast, with the rotational resistance of the second slip gear 30 when the second slip gear 30 moves to the ON home position, the boss 30c of the second slip gear 30 does not contact the contact portion 31c of the slide member 31. Hence, the rotational resistance of the second slip gear 30 is as large as the rotational sliding load of the second slip gear 30. The second slip gear 30 is rotatable by the elastic force of the torsion spring 28 set at the small value as described above. Hence, when the second slip gear 30 moves to the ON home position, the slip portion is not formed at the first slip gear 29 or the second slip gear 30, and the first gear portion 29c meshes with the second gear portion 30a.

As described above, in the second slip gear 30, the second slip portion 30b is arranged only at a position, at which the second slip gear 30 receives a large rotational resistance (a position serving as the OFF home position). In the second slip gear 30, the slip portion is not arranged at a position, at which the rotational resistance to be received by the second slip gear 30 is relatively small (a position serving as the ON home position), and the second gear portion 30a is arranged. That is, among the stop phases in which the second slip gear 30 stops (the ON home position, the OFF home position), the slip portion (the second slip portion 30b) is arranged only in a stop phase with a large load required when the first slip gear 29 rotates the second slip gear 30. In a stop phase with a relatively small load, the gear portion (the second gear portion 30a) is arranged. Accordingly, the slip portions (the second slip portions 30b) can be provided by a minimum number. That is, the number of slip portions is smaller than the total number of stop phases in one cycle of the second slip gear. The second slip portions 30b each have the size corresponding to 3 teeth of the second gear portion 30a. Hence, by providing the second slip portions 30b by the minimum number, the tooth-number diameter of the second slip gear 30 is not required to be larger than its necessity. Accordingly, the size of the tooth-number diameter of the second slip gear 30 forming the drive transmission device DR can be decreased.

As described above, with this embodiment, by using the first slip gear 29 and the second slip gear 30, the elastic force of the torsion spring 28 can be set at a small value. Therefore, similarly to the first embodiment, the increase in size and cost can be avoided. Also, the sound which is generated because the elastic member collides with the driven rotational body when the elastic member presses the driven rotational body, and the sound which is generated because the driven rotational body rotated by the elastic member collides with the retaining claw can be decreased.

Also, the ease of assembly and workability are less degraded, and the driving force required for the drive source (the motor M) can be decreased. Accordingly, a low-output, inexpensive, and small drive source can be used.

Also, even with the configuration that determines positions of the slide member 31 being the driven member at a plurality of positions (in a plurality of phases), the second slip portion 30b is used only when the slide member 31 is at partial positions instead of all positions. Accordingly, the tooth-number diameter of the second slip gear 30 is not required to be larger than its necessity. The size of the tooth-number diameter of the second slip gear 30 forming the drive transmission device DR can be decreased.

The slide member 31 being the driven member linearly moves in a reciprocating manner by the second slip gear 30. However, the driven member is not limited thereto. That is, the driven member can have merely a case of a relatively large moving load and a case of a relatively small moving load depending on the phase. The movement of the driven member can be rotation, or one-direction movement instead of reciprocation.

The configuration in which the slip portion is provided only in partial stop phases among the stop phases and the gear portion is provided in the other stop phase like the fourth clutch device B4 of the above-described embodiment can be applied to a configuration similar to any of the first to third clutch devices B1 to B3 described in the first to third embodiments.

With the invention, the elastic force of the elastic member required for rotating the driven rotational body can be decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2015/050439, filed Jan. 9, 2015, which is hereby incorporated by reference herein in its entirety.

The invention claimed is:

1. A drive transmission device comprising:
a driving rotational body;
a driven rotational body that rotates by engaging with the driving rotational body;
a driven member that is driven by the rotation of the driven rotational body;
an elastic member that rotates the driven rotational body by an elastic force when the driven rotational body does not engage with the driving rotational body; and
a first rotational body and a second rotational body arranged downstream of the driven rotational body in a drive train that transmits a driving force from the driving rotational body to the driven member, the first rotational body being configured to rotate in synchronization with the driven rotational body, the second rotational body being configured to be rotated by the first rotational body and drive the driven member,
wherein the first rotational body and the second rotational body are gears that mesh with each other,
wherein the first rotational body rotates without rotating the second rotational body when the driven rotational body rotates by the elastic force of the elastic member,
wherein an arcuate surface coaxial with a rotation center of the first rotational body is provided in a portion of the first rotational body that faces the second rotational body in a phase in which the first rotational body does not rotate the second rotational body, and an arcuate surface extending along the arcuate surface of the first rotational body is provided in a portion of the second rotational body that faces the first rotational body in the phase in which the first rotational body does not rotate the second rotational body,
wherein, in a state where the arcuate surface of the first rotational body and the arcuate surface of the second rotational body are in contact with each other, the first rotational body rotates without rotating the second rotational body when the driven rotational body rotates by the elastic force of the elastic member, and wherein the elastic member is a torsion spring of which center being coaxial with a rotation axis of the second rotational body.

2. The drive transmission device according to claim 1, wherein the first rotational body rotates the second rotational body when the driven rotational body engages with the driving rotational body and rotates.

3. The drive transmission device according to claim 1, wherein the number of teeth of the first rotational body is larger than the number of teeth of the second rotational body by one tooth.

4. The drive transmission device according to claim 1, wherein the driving rotational body and the driven rotational body are gears that mesh and engage with each other, and the driven rotational body has a portion that does not have a gear portion and does not mesh with the driving rotational body.

5. The drive transmission device according to claim 1, wherein the driven rotational body is rotated to a position, at which the engagement between the driven rotational body and the driving rotational body is completely released, by the elastic force of the elastic member.

6. The drive transmission device according to claim 1, wherein the driven rotational body is rotated from a position, at which the engagement between the driven rotational body and the driving rotational body is completely released, in a direction in which the driven rotational body engages with the driving rotational body, by the elastic force of the elastic member.

7. The drive transmission device according to claim 1, wherein the driven rotational body has a pressed surface that is pressed by the elastic force of the elastic member, and the driven rotational body rotates as a result that the pressed surface is pressed.

8. The drive transmission device according to claim 1, wherein the driven rotational body has a pressing surface that presses the elastic member, and the pressing surface presses and deforms the elastic member against the elastic force of the elastic member when the driven rotational body engages with the driving rotational body and rotates.

9. The drive transmission device according to claim 1, wherein the driven rotational body holds an engagement member that can engage with the driving rotational body, and the engagement member can move between a position, at which the engagement member engages with the driving rotational body, and a position, at which the engagement member does not engage with the driving rotational body, by moving relative to the driven rotational body.

10. The drive transmission device according to claim 9, wherein the engagement member is urged in a direction from the position, at which the engagement member does not engage with the driving rotational body, to the position, at which the engagement member engages with the driving rotational body.

11. The drive transmission device according to claim 1, wherein the driven member includes a cam portion, and wherein the drive transmission device comprises urging means for urging the cam portion, the cam portion being configured to rotate against an urging force of the urging means.

12. An image forming apparatus comprising:
the drive transmission device according to claims 1;
toner-image forming means for forming a toner image on an image bearing body; and
a transfer roller that transfers the toner image formed on the image bearing body onto a transferred member,
wherein the transfer roller is moved away from the image bearing body by rotating the driven member of the drive transmission device.

13. The drive transmission device according to claim 1, further comprising: another driven rotational body that rotates coaxially with the driven rotational body by engaging with the driving rotational body; and another elastic member provided between the driven rotational body and the other driven rotational body, wherein the driven rotational body is rotated to a position, at which the engagement between the driven rotational body and the driving rotational body is completely released, by the elastic force of the elastic member against an urging force of the other elastic member.

14. The drive transmission device according to claim 1, wherein the driven member is a moving member that moves in a reciprocating manner between a first position and a second position, the moving member being configured to move to the first position as a result that the moving member contacts the second rotational body and is pressed against an urging force of urging means, the moving member being configured to move to the second position by the urging force of the urging means.

15. An image forming apparatus comprising:
the drive transmission device according to claim 14; a developing member that causes a toner to adhere to an image bearing body; and a drive source that rotates the developing member,
wherein a driving force from the drive source is not transmitted to the developing member when the driven member of the drive transmission device is at the first position, and the driving force from the drive source is transmitted to the developing member and the developing member rotates when the driven member of the drive transmission device is at the second position.

* * * * *